United States Patent
Choi et al.

(10) Patent No.: US 11,686,945 B2
(45) Date of Patent: Jun. 27, 2023

(54) METHODS OF DRIVING LIGHT SOURCES IN A NEAR-EYE DISPLAY

(71) Applicant: Meta Platforms Technologies, LLC, Menlo Park, CA (US)

(72) Inventors: Min Hyuk Choi, San Jose, CA (US); Zhiming Zhuang, Sammamish, WA (US); Wonjae Choi, San Jose, CA (US); Cheonhong Kim, Mountain View, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 27 days.

(21) Appl. No.: 17/529,674

(22) Filed: Nov. 18, 2021

(65) Prior Publication Data

US 2022/0146832 A1    May 12, 2022

Related U.S. Application Data

(63) Continuation of application No. 17/063,026, filed on Oct. 5, 2020, now Pat. No. 11,209,656.

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G02B 27/0101* (2013.01);
(Continued)

(58) Field of Classification Search
USPC ............................................. 345/7
See application file for complete search history.

(56) References Cited

U.S. PATENT DOCUMENTS

| 5,526,072 A * | 6/1996 | El Hage | A61B 3/107 |
| | | | 351/212 |
| 9,299,320 B1 * | 3/2016 | Gupta | G09G 3/3406 |

(Continued)

FOREIGN PATENT DOCUMENTS

WO    WO-2018168781 A1    9/2018

OTHER PUBLICATIONS

Notice of Allowance dated Aug. 18, 2021 for U.S. Appl. No. 17/063,026, filed Oct. 5, 2020, 9 pages.
(Continued)

*Primary Examiner* — Chineyere D Wills-Burns
(74) *Attorney, Agent, or Firm* — Weaver Austin Villeneuve & Sampson LLP

(57) ABSTRACT

A method including determining a maximum luminance location of a display based on a field of view of an eye of a user of the display, and driving a plurality of light sources in the display based on locations of the plurality of light sources with respect to the maximum luminance location of the display. The plurality of light sources is controlled to have different luminance levels in different display zones corresponding to different zones on the retina of the eye of the user. In some examples, the display zones of the display system that have higher luminance levels can be dynamically changed based on the field of view or the gaze direction of the eye of the user.

20 Claims, 14 Drawing Sheets

(51) Int. Cl.
  *G06F 3/01*      (2006.01)
  *G06F 3/147*     (2006.01)
  *G09G 3/3208*    (2016.01)
  *G09G 5/10*      (2006.01)
  *G09G 3/32*      (2016.01)
  *G09G 3/3225*    (2016.01)

(52) U.S. Cl.
  CPC ......... *G02B 27/0179* (2013.01); *G06F 3/013* (2013.01); *G06F 3/147* (2013.01); *G09G 3/3208* (2013.01); *G09G 5/10* (2013.01); *G02B 2027/0178* (2013.01); *G02B 2027/0187* (2013.01)

(56) References Cited

U.S. PATENT DOCUMENTS

| | | | |
|---|---|---|---|
| 10,176,639 B2 | 1/2019 | Schowengerdt et al. | |
| 11,112,791 B2 | 9/2021 | Bhanushali et al. | |
| 11,209,656 B1 | 12/2021 | Choi et al. | |
| 2008/0252591 A1* | 10/2008 | Peeters | G09G 3/3413 362/234 |
| 2012/0249797 A1* | 10/2012 | Haddick | G04G 21/04 701/491 |
| 2013/0088413 A1* | 4/2013 | Raffle | G09G 3/003 359/630 |
| 2013/0114043 A1* | 5/2013 | Balan | A61B 3/113 351/210 |
| 2014/0071296 A1 | 3/2014 | Nagai | |
| 2014/0253605 A1* | 9/2014 | Border | G02B 27/017 345/690 |
| 2014/0313760 A1* | 10/2014 | Yagi | F21S 41/148 362/520 |
| 2016/0034032 A1* | 2/2016 | Jeong | G02B 27/0093 345/156 |
| 2017/0169749 A1* | 6/2017 | Masuda | G09G 3/3413 |
| 2017/0337857 A1* | 11/2017 | Tiberi | G06F 3/016 |
| 2018/0188803 A1* | 7/2018 | Sharma | G06F 3/013 |
| 2018/0308266 A1 | 10/2018 | Surti et al. | |
| 2018/0330674 A1* | 11/2018 | Baar | H05B 45/20 |
| 2019/0246087 A1* | 8/2019 | Uesaka | H04N 5/91 |
| 2020/0074941 A1* | 3/2020 | Takahashi | G09G 3/36 |
| 2020/0348665 A1 | 11/2020 | Bhanushali et al. | |

OTHER PUBLICATIONS

International Search Report and Written Opinion for International Application No. PCT/US2021/052838, dated Jan. 5, 2022, 12 pages.

* cited by examiner

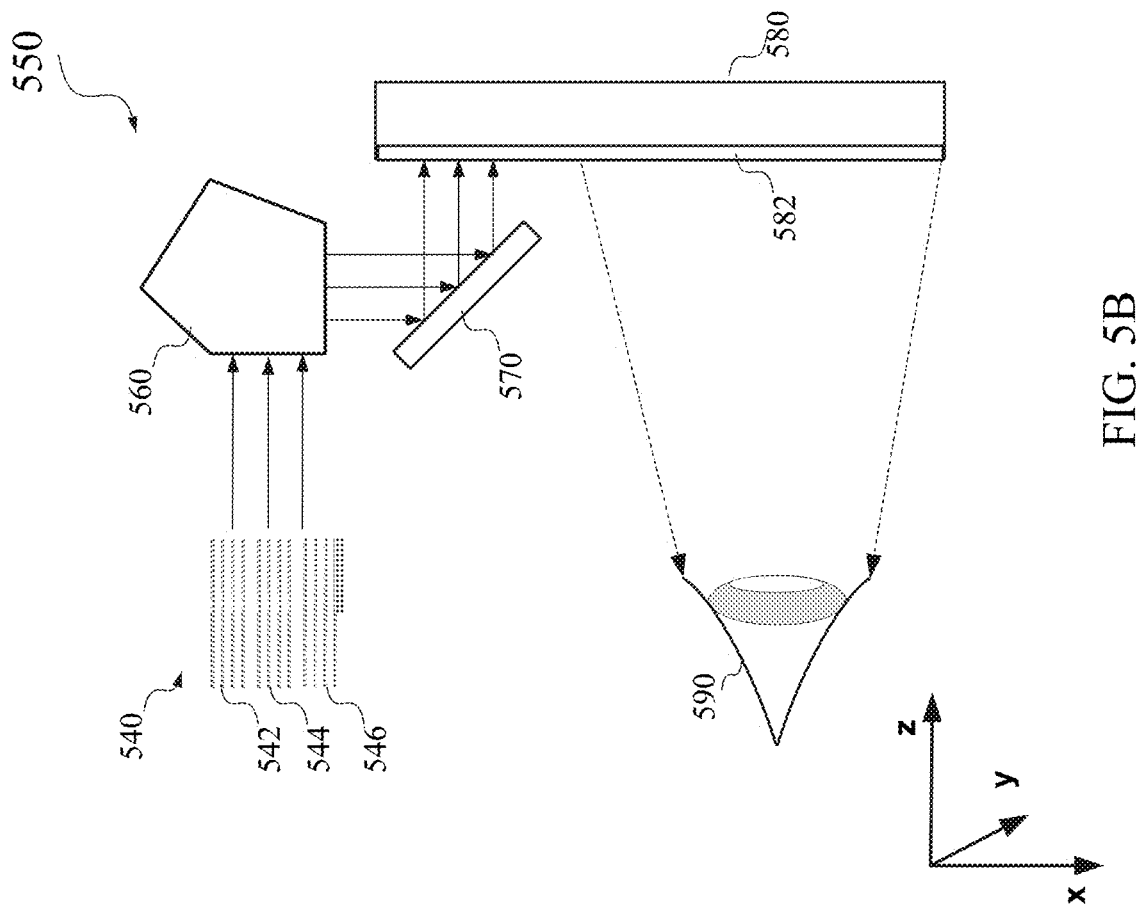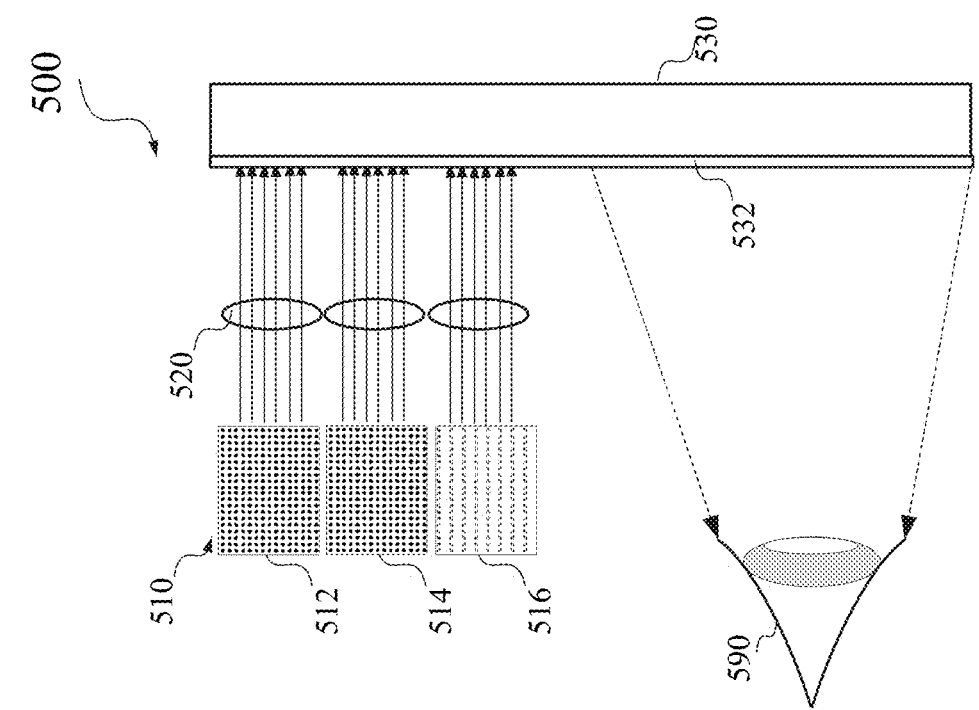
FIG. 5A
FIG. 5B

METHODS OF DRIVING LIGHT SOURCES IN A NEAR-EYE DISPLAY

CROSS-REFERENCE TO RELATED APPLICATIONS

This application is a continuation of U.S. Non-Provisional application Ser. No. 17/063,026, filed Oct. 5, 2020, titled "METHODS OF DRIVING LIGHT SOURCES IN A NEAR-EYE DISPLAY," which is herein incorporated by reference in its entirety for all purposes.

BACKGROUND

An artificial reality system, such as a head-mounted display (HMD) or heads-up display (HUD) system, generally includes a near-eye display system in the form of a headset or a pair of glasses and is configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). The display system generally includes one or more light sources that are driven to output light at various luminance levels.

SUMMARY

This disclosure relates generally to display system. According to certain embodiments, a method may include determining a maximum luminance location of a display based on a field of view of an eye of a user of the display, and driving a plurality of light sources in the display based on locations of the plurality of light sources with respect to the maximum luminance location of the display. Each light source of the plurality of light sources may be driven by a respective drive circuit to emit light. For a first light source and a second light source in the plurality of light sources and associated with a same input display value, the first light source may be driven to emit light at a first luminance level higher than a second luminance level of the second light source that is farther from the maximum luminance location than the first light source.

In some embodiments of the method, the maximum luminance location is at a center of the field of view of the eye of the user or within a field of view of a fovea of the eye of the user. Determining the maximum luminance location of the display may include tracking a position of the eye of the user with respect to the display. Driving the plurality of light sources may include driving the first light source based on the input display value and a first relationship between input display values and luminance levels for light sources in a first display zone of the display, and driving the second light source based on the input display value and a second relationship between input display values and luminance levels for light sources in a second display zone of the display. The luminance levels for the light sources in the first display zone may be characterized by a first range larger than a second range of the luminance levels for the light sources in the second display zone. In some embodiments, the difference between the first luminance level and the second luminance level may be less than a threshold value. Each light source of the plurality of light sources may include, for example, an organic light emitting diode (OLED) or a micro-light emitting diode (micro-LED).

According to certain embodiments, a system may include a display including a plurality of light sources, and a display controller including a respective drive circuit for each of the plurality of light sources. The display controller may be configured to select a maximum luminance location of the display based on a field of view of an eye of a user of the system, and drive the plurality of light sources based on locations of the plurality of light sources with respect to the maximum luminance location of the display. For a first light source and a second light source in the plurality of light sources and associated with a same input display value, the display controller is configured to drive the first light source to emit light at a first luminance level higher than a second luminance level of the second light source that is farther from the maximum luminance location than the first light source.

In some embodiments of the system, the maximum luminance location may be in a field of view of a fovea of the eye of the user or a center of the field of view of the eye of the user. In some embodiments, the maximum luminance location may be at a center of the display. In some embodiments, each light source of the plurality of light sources may include an organic light emitting diode (OLED) or a micro-light emitting diode (micro-LED).

In some embodiments, the display controller may be configured to drive the first light source based on the input display value and a first relationship between input display values and luminance levels for light sources in a first display zone of the display, and drive the second light source based on the input display value and a second relationship between input display values and luminance levels for light sources in a second display zone of the display, where the luminance levels for the light sources in the first display zone are characterized by a first range lager than a second range of the luminance levels for the light sources in the second display zone. In some embodiments, a difference between the first luminance level and the second luminance level may be less than a threshold value that is noticeable by the eye of the user. In some embodiments, the display controller may be configured to drive each light source of the plurality of light sources based upon a distance from the light source to the maximum luminance location.

In some embodiments, the system may include an eye-tracking subsystem configured to track a position of the eye of the user with respect to the display and determine a gaze direction or the field of view of the eye of the user.

According to certain embodiments, a non-transitory machine-readable storage medium may include instructions stored thereon. The instructions, when executed by one or more processors, may cause the one or more processors to perform operations including determining a maximum luminance location of a display based on a field of view of an eye of a user of the display, and driving a plurality of light sources in the display based on locations of the plurality of light sources with respect to the maximum luminance location of the display. Each light source of the plurality of light sources may be driven by a respective drive circuit to emit light. For a first light source and a second light source in the plurality of light sources and associated with a same input display value, the first light source may be driven to emit light at a first luminance level higher than a second luminance level of the second light source that is farther from the maximum luminance location than the first light source.

In some embodiments of the non-transitory machine-readable storage medium, the maximum luminance location may be at a center of the field of view of the eye of the user. In some embodiments, determining the maximum luminance location of the display may include tracking a position of the eye of the user with respect to the display. In some embodiments, driving the plurality of light sources may include driving the first light source based on the input display value and a first relationship between input display values and luminance levels for light sources in a first display zone of the display, and driving the second light source based on the input display value and a second relationship between input display values and luminance levels for light sources in a second display zone of the display. The luminance levels for the light sources in the first display zone may be characterized by a first range larger than a second range of the luminance levels for the light sources in the second display zone.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 5A illustrates an example of a near-eye display device including a waveguide display according to certain embodiments.

FIG. 5B illustrates an example of a near-eye display device including a waveguide display according to certain embodiments.

Figure 1:
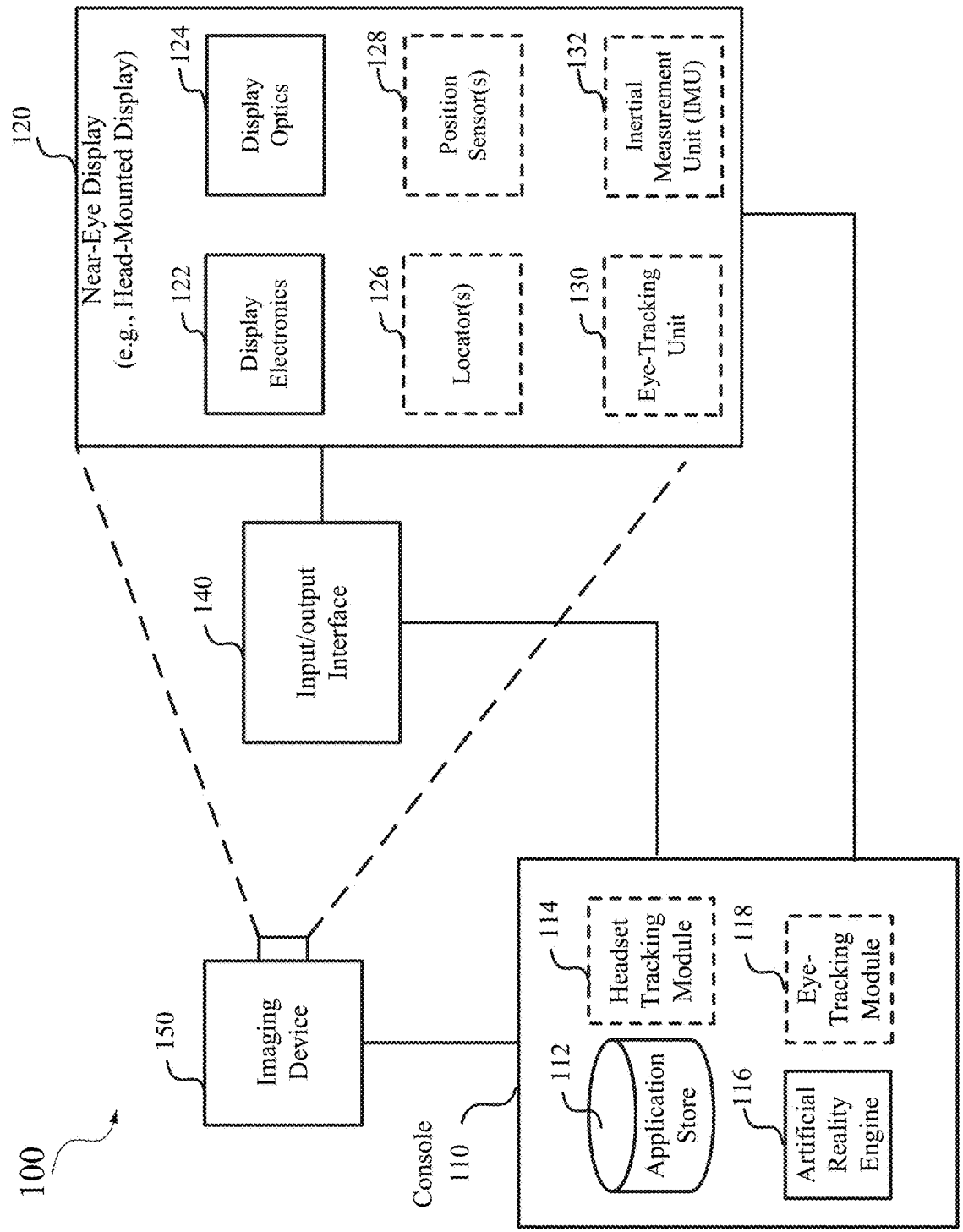
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to display systems. More specifically, and without limitation, disclosed herein are techniques for controlling the luminance levels of light sources in display systems. Techniques disclosed herein can improve the power efficiency of the display system, while maintaining the user experience. Various inventive embodiments are described herein, including devices, systems, methods, materials, and the like.

For a portable display system, such as a near-eye display system, it may be desirable that the display system has a lower power consumption and thus a longer battery life and/or a longer battery lifespan. It is also desirable that the display system has a high luminance level or light intensity for a good user experience. Therefore, a display system that can both achieve a high luminance and have a low power consumption may be needed.

Human eyes are generally less sensitive to light from larger viewing angles with respect to the foveal axis. The sensitivity may peak at the foveal zone and quickly decrease outside of the foveal zone. For example, the number of receptors may decrease from approximately 155,000 receptors per square millimeter near the fovea to fewer than 10,000 receptors per square millimeter at a region corresponding to a view angle of 10° or greater with respect to the foveal axis. Therefore, portions of a display panel that are farther away from the center of the field of view of a user may not be very noticeable to the user's eye even if these portions of the display panel have high luminance levels or high light intensities.

According to certain embodiments, light sources in a display may be controlled to have different luminance levels in different display zones corresponding to different zones on the retina of a user's eye. For example, the light sources in a display zone that may be imaged onto a zone of the retina including the fovea may have higher luminance levels (or brightness), while light sources in a display zone that may be imaged onto a peripheral zone of the retina may have lower luminance levels. In one example, in an active matrix organic light emitting diode (AMOLED) display panel that includes a plurality of organic light emitting diodes (OLEDs), each OLED may be driven individually by a drive circuit to emit light at a desired luminance level. Each OLED may emit at a different respective luminance level, or a subset of OLEDs within a same display zone may emit at the same luminance level. By reducing the luminance of the OLEDs in peripheral zones, the power used by the display panel may be reduced, with minimum or no impact on user experience. In some examples, the reduction in power may be between about 5% and about 10%, between about 10% and about 20%, between about 20% and about 30%, or between about 30% and about 40%. In another example, a micro-LED array-based display system may include individually controlled micro-LEDs, where the micro-LEDs at different regions of the micro-LED array may be controlled to emit at different luminance levels.

In addition, the display zones of the display system that have higher luminance levels may be dynamically changed based on the field of view (or the gaze direction) of the user's eye. For example, an eye-tracking subsystem of the display system may track the movement of the user's eye to determine a center of the field of view (or the gaze direction) of the user's eye. The control and driving circuits may then control the light sources at the center of the field of view to emit at high luminance levels, and control the light sources at other display zones to emit at different lower luminance levels based on the locations of the display zones with respect to the center of the field of view.

As used herein, the term "organic light emitting diode" or "OLED" refers to a light emitting diode having an emissive electroluminescent layer that includes an organic compound that emits light in response to an electric current. The emissive layer may be arranged between an anode and a cathode. The organic compound may include small molecules or polymers.

As used herein, the term "active matrix organic light emitting diode" or "AMOLED" display refers to a display that uses a thin-film transistor backplane to directly control each individual pixel. An AMOLED display does not use a backlight, because each individual OLED is self-emissive. The amount of luminance provided by each OLED depends on the current provided to the OLED.

As used herein, the term "micro-LED" or "µLED" refers to an LED that has a chip where a linear dimension of the chip is less than about 200 µm, such as less than 100 µm, less than 50 µm, less than 20 µm, less than 10 µm, or smaller. For example, the linear dimension of a micro-LED may be as small as 6 µm, 5 µm, 4 µm, 2 µm, or smaller. Some micro-LEDs may have a linear dimension (e.g., length or diameter) comparable to the minority carrier diffusion length. However, the disclosure herein is not limited to micro-LEDs, and may also be applied to mini-LEDs and large LEDs.

As used herein, the term "luminance" refers generally to a photometric measure of the luminous intensity per unit area of light travelling in a certain direction. Luminance describes the amount of light that is emitted from, passing through, or reflected from an area and falls within a certain solid angle. The luminance level indicates how much luminous power could be detected by a sensor (e.g., the human eye) looking at a surface from a certain angle of view. Luminance may be an indicator of how bright a surface may appear. The international standard unit for luminance is candela per square meter ($cd/m^2$). Luminance is used in the video industry to characterize the brightness of displays. The term "brightness" refers generally to the perception elicited by the luminance of an object. A given target luminance may elicit different perceptions of brightness in different contexts. In an RGB color space, brightness can be determined based on the red, green, and blue color coordinates In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive.

The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback applications, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking system 130 and eye positions to determine a reference eye position from an image captured by eye-tracking system 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display system 120. Example eye calibration parameters may include an estimated distance between a component of eye-tracking system 130 and one or more parts of the eye, such as the eye's center, pupil, cornea boundary, or a point on the surface of the eye. Other example eye calibration parameters may be specific to a user and may include an estimated average eye radius, an average corneal radius, an average sclera radius, a map of features on the eye surface, and an estimated eye surface contour. In embodiments where light from the outside of near-eye display system 120 may reach the eye (as in some augmented reality applications), the calibration parameters may include correction factors for intensity and color balance due to variations in light from the outside of near-eye display system 120. Eye-tracking module 118 may use eye calibration parameters to determine whether the measurements captured by eye-tracking system 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display system 120 experiencing greater than a threshold change in illumination due to external light. In some embodiments, at least some of the functions of eye-tracking module 118 may be performed by eye-tracking system 130.

Figure 2:
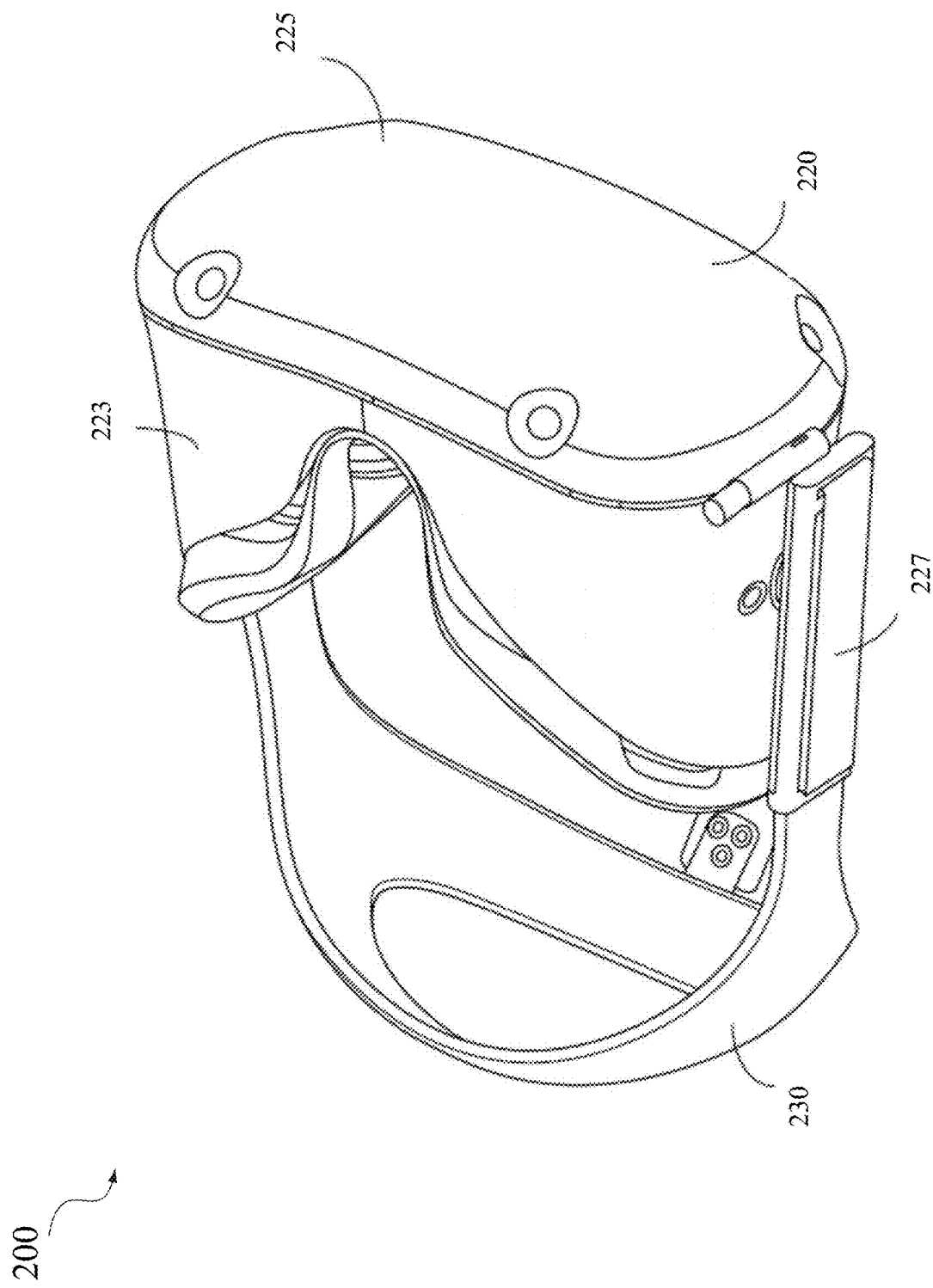
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof.

The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
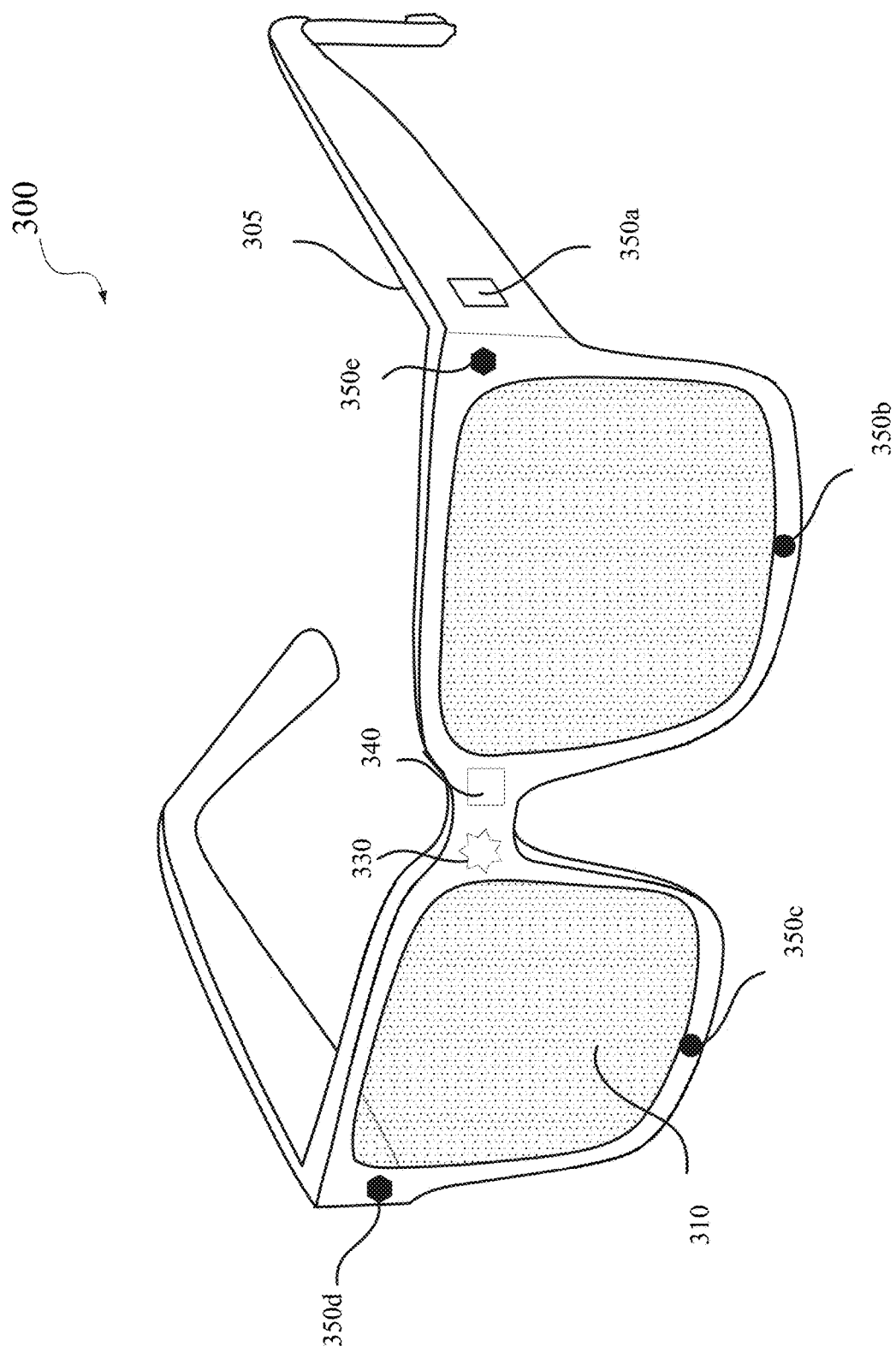
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
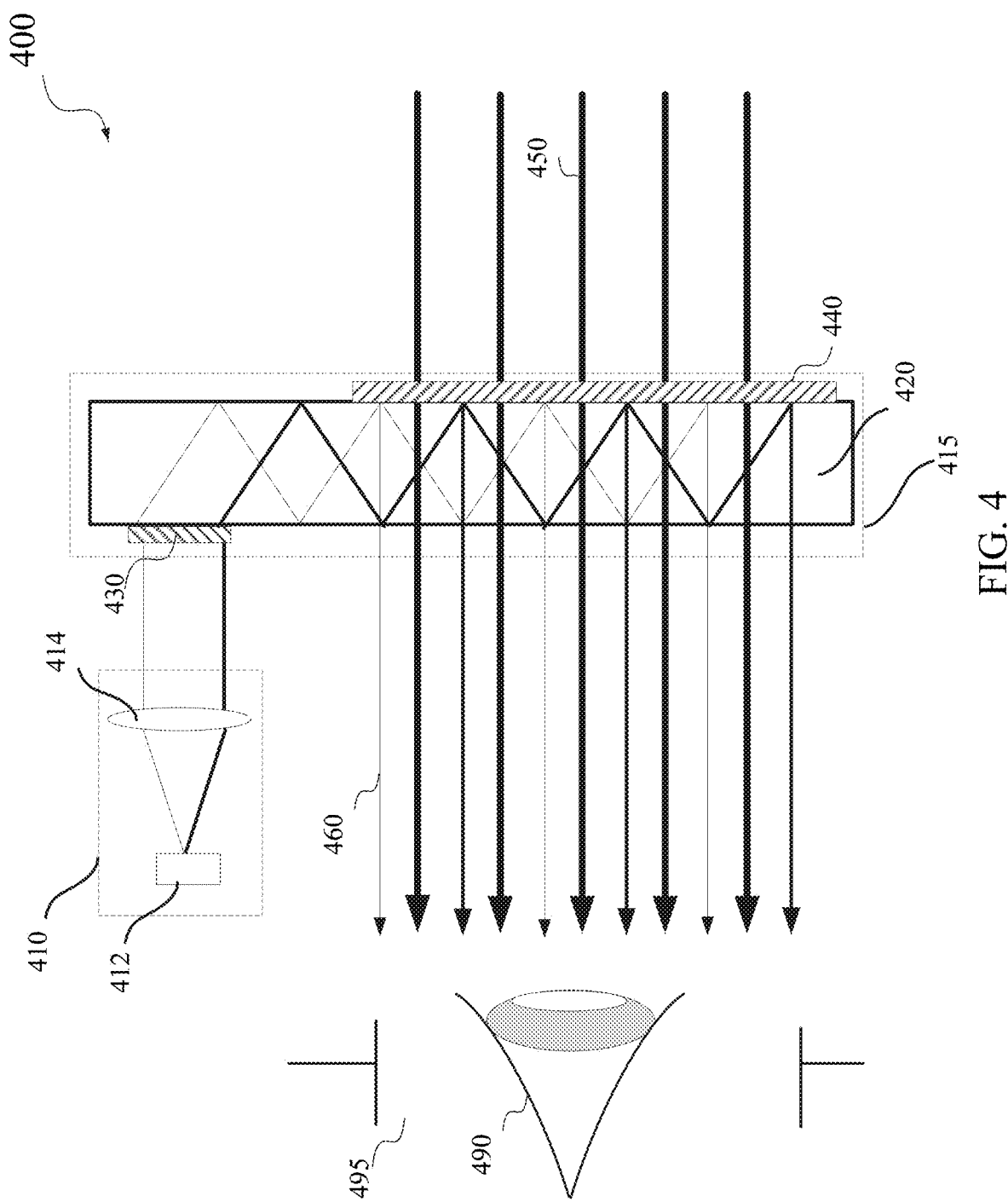
FIG. 4 illustrates an example of an optical see-through augmented reality system including a waveguide display according to certain embodiments.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements (DOEs), prisms, etc. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

FIG. 5A illustrates an example of a near-eye display (NED) device 500 including a waveguide display 530 according to certain embodiments. NED device 500 may be an example of near-eye display 120, augmented reality system 400, or another type of display device. NED device 500 may include a light source 510, projection optics 520, and waveguide display 530. Light source 510 may include multiple panels of light emitters for different colors, such as a panel of red light emitters 512, a panel of green light emitters 514, and a panel of blue light emitters 516. The red light emitters 512 are organized into an array; the green light emitters 514 are organized into an array; and the blue light emitters 516 are organized into an array. The dimensions and pitches of light emitters in light source 510 may be small. For example, each light emitter may have a diameter less than 2 μm (e.g., about 1.2 μm) and the pitch may be less than 2 μm (e.g., about 1.5 μm). As such, the number of light emitters in each red light emitters 512, green light emitters 514, and blue light emitters 516 can be equal to or greater than the number of pixels in a display image, such as 960×720, 1280×720, 1440×1080, 1920×1080, 2160×1080, or 2560×1080 pixels. Thus, a display image may be generated simultaneously by light source 510. A scanning element may not be used in NED device 500.

Before reaching waveguide display 530, the light emitted by light source 510 may be conditioned by projection optics 520, which may include a lens array. Projection optics 520 may collimate or focus the light emitted by light source 510 to waveguide display 530, which may include a coupler 532 for coupling the light emitted by light source 510 into waveguide display 530. The light coupled into waveguide display 530 may propagate within waveguide display 530 through, for example, total internal reflection as described above with respect to FIG. 4. Coupler 532 may also couple portions of the light propagating within waveguide display 530 out of waveguide display 530 and towards user's eye 590.

FIG. 5B illustrates an example of a near-eye display (NED) device 550 including a waveguide display 580 according to certain embodiments. In some embodiments, NED device 550 may use a scanning mirror 570 to project light from a light source 540 to an image field where a user's eye 590 may be located. NED device 550 may be an example of near-eye display 120, augmented reality system 400, or another type of display device. Light source 540 may include one or more rows or one or more columns of light emitters of different colors, such as multiple rows of red light emitters 542, multiple rows of green light emitters 544, and multiple rows of blue light emitters 546. For example, red light emitters 542, green light emitters 544, and blue light emitters 546 may each include N rows, each row including, for example, 2560 light emitters (pixels). The red light emitters 542 are organized into an array; the green light emitters 544 are organized into an array; and the blue light emitters 546 are organized into an array. In some embodiments, light source 540 may include a single line of light emitters for each color. In some embodiments, light source 540 may include multiple columns of light emitters for each of red, green, and blue colors, where each column may include, for example, 1080 light emitters. In some embodiments, the dimensions and/or pitches of the light emitters in light source 540 may be relatively large (e.g., about 3-5 μm) and thus light source 540 may not include sufficient light emitters for simultaneously generating a full display image. For example, the number of light emitters for a single color may be fewer than the number of pixels (e.g., 2560×1080 pixels) in a display image. The light emitted by light source 540 may be a set of collimated or diverging beams of light.

Before reaching scanning mirror 570, the light emitted by light source 540 may be conditioned by various optical devices, such as collimating lenses or a freeform optical element 560. Freeform optical element 560 may include, for example, a multi-facet prism or another light folding element that may direct the light emitted by light source 540 towards scanning mirror 570, such as changing the propagation direction of the light emitted by light source 540 by, for example, about 90° or larger. In some embodiments, freeform optical element 560 may be rotatable to scan the light. Scanning mirror 570 and/or freeform optical element 560 may reflect and project the light emitted by light source 540 to waveguide display 580, which may include a coupler 582 for coupling the light emitted by light source 540 into waveguide display 580. The light coupled into waveguide display 580 may propagate within waveguide display 580 through, for example, total internal reflection as described above with respect to FIG. 4. Coupler 582 may also couple portions of the light propagating within waveguide display 580 out of waveguide display 580 and towards user's eye 590.

Scanning mirror 570 may include a microelectromechanical system (MEMS) mirror or any other suitable mirrors. Scanning mirror 570 may rotate to scan in one or two dimensions. As scanning mirror 570 rotates, the light emitted by light source 540 may be directed to a different area of waveguide display 580 such that a full display image may be projected onto waveguide display 580 and directed to user's eye 590 by waveguide display 580 in each scanning cycle. For example, in embodiments where light source 540 includes light emitters for all pixels in one or more rows or columns, scanning mirror 570 may be rotated in the column or row direction (e.g., x or y direction) to scan an image. In embodiments where light source 540 includes light emitters for some but not all pixels in one or more rows or columns, scanning mirror 570 may be rotated in both the row and column directions (e.g., both x and y directions) to project a display image (e.g., using a raster-type scanning pattern).

NED device 550 may operate in predefined display periods. A display period (e.g., display cycle) may refer to a duration of time in which a full image is scanned or projected. For example, a display period may be a reciprocal of the desired frame rate. In NED device 550 that includes scanning mirror 570, the display period may also be referred to as a scanning period or scanning cycle. The light generation by light source 540 may be synchronized with the rotation of scanning mirror 570. For example, each scanning cycle may include multiple scanning steps, where light source 540 may generate a different light pattern in each respective scanning step.

In each scanning cycle, as scanning mirror 570 rotates, a display image may be projected onto waveguide display 580 and user's eye 590. The actual color value and light intensity (e.g., brightness) of a given pixel location of the display image may be an average of the light beams of the three colors (e.g., red, green, and blue) illuminating the pixel location during the scanning period. After completing a scanning period, scanning mirror 570 may revert back to the initial position to project light for the first few rows of the next display image or may rotate in a reverse direction or scan pattern to project light for the next display image, where a new set of driving signals may be fed to light source 540. The same process may be repeated as scanning mirror 570 rotates in each scanning cycle. As such, different images may be projected to user's eye 590 in different scanning cycles.

Figure 6:
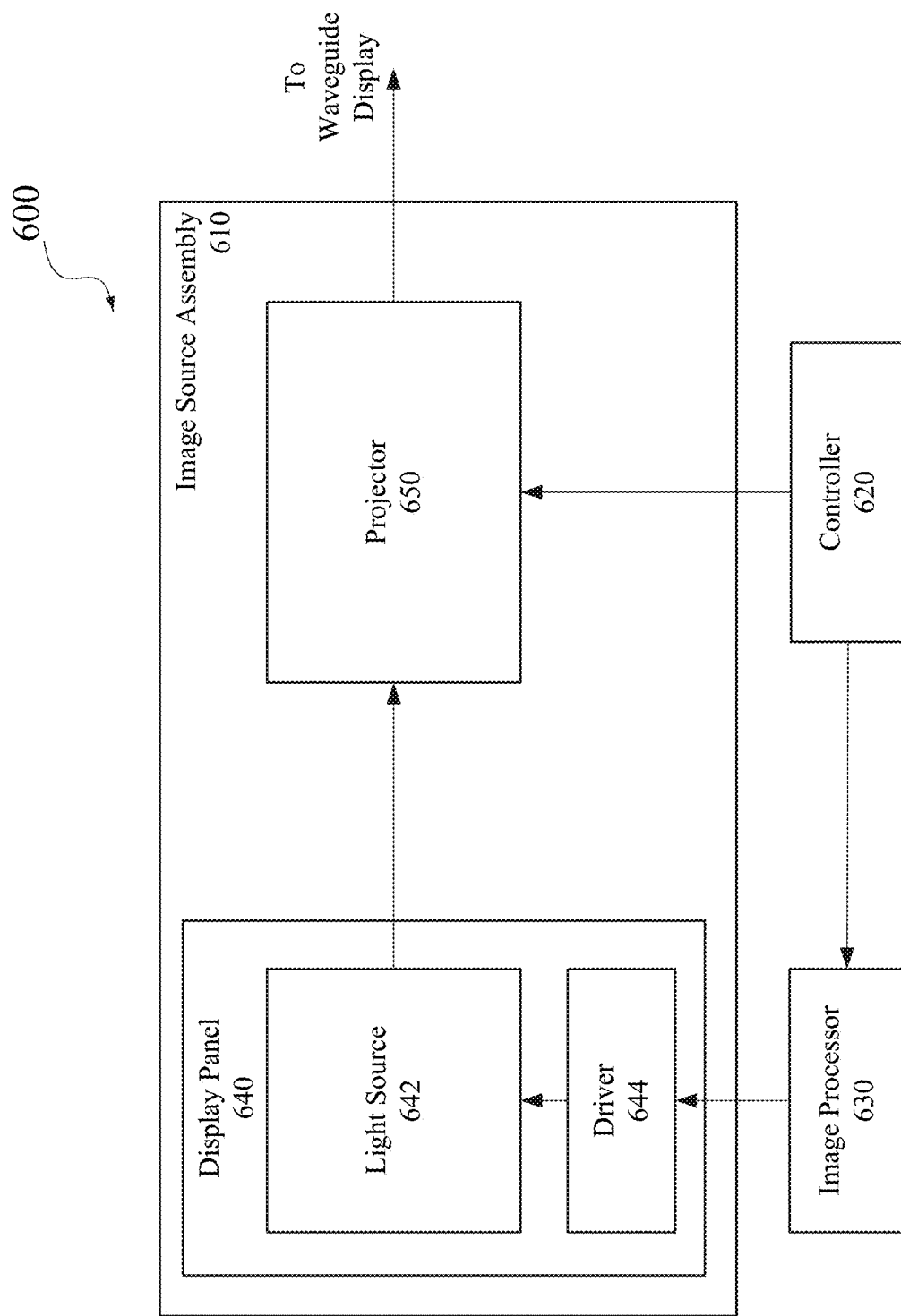
FIG. 6 illustrates an example of an image source assembly in an augmented reality system according to certain embodiments.

FIG. 6 illustrates an example of an image source assembly 610 in a near-eye display system 600 according to certain embodiments. Image source assembly 610 may include, for example, a display panel 640 that may generate display images to be projected to the user's eyes, and a projector 650 that may project the display images generated by display panel 640 to a waveguide display as described above with respect to FIGS. 4-5B. Display panel 640 may include a light source 642 and a driver circuit 644 for light source 642. Light source 642 may include, for example, light source 510 or 540. Projector 650 may include, for example, freeform optical element 560, scanning mirror 570, and/or projection optics 520 described above. Near-eye display system 600 may also include a controller 620 that synchronously controls light source 642 and projector 650 (e.g., scanning mirror 570). Image source assembly 610 may generate and output an image light to a waveguide display (not shown in FIG. 6), such as waveguide display 530 or 580. As described above, the waveguide display may receive the image light at one or more input-coupling elements, and guide the received image light to one or more output-coupling elements. The input and output coupling elements may include, for example, a diffraction grating, a holographic grating, a prism, or any combination thereof. The input-coupling element may be chosen such that total internal reflection occurs with the waveguide display. The output-coupling element may couple portions of the total internally reflected image light out of the waveguide display.

As described above, light source 642 may include a plurality of light emitters arranged in an array or a matrix. Each light emitter may emit monochromatic light, such as red light, blue light, green light, infra-red light, and the like. While RGB colors are often discussed in this disclosure, embodiments described herein are not limited to using red, green, and blue as primary colors. Other colors can also be used as the primary colors of near-eye display system 600. In some embodiments, a display panel in accordance with an embodiment may use more than three primary colors. Each pixel in light source 642 may include three subpixels that include a red micro-LED, a green micro-LED, and a blue micro-LED. A semiconductor LED generally includes an active light emitting layer within multiple layers of semiconductor materials. The multiple layers of semiconductor materials may include different compound materials or a same base material with different dopants and/or different doping densities. For example, the multiple layers of semiconductor materials may include an n-type material layer, an active region that may include hetero-structures (e.g., one or more quantum wells), and a p-type material layer. The multiple layers of semiconductor materials may be grown on a surface of a substrate having a certain orientation. In some embodiments, to increase light extraction efficiency, a mesa that includes at least some of the layers of semiconductor materials may be formed.

Controller 620 may control the image rendering operations of image source assembly 610, such as the operations of light source 642 and/or projector 650. For example, controller 620 may determine instructions for image source assembly 610 to render one or more display images. The instructions may include display instructions and scanning instructions. In some embodiments, the display instructions may include an image file (e.g., a bitmap file). The display instructions may be received from, for example, a console, such as console 110 described above with respect to FIG. 1. The scanning instructions may be used by image source assembly 610 to generate image light. The scanning instructions may specify, for example, a type of a source of image light (e.g., monochromatic or polychromatic), a scanning rate, an orientation of a scanning apparatus, one or more illumination parameters, or any combination thereof. Controller 620 may include a combination of hardware, software, and/or firmware not shown here so as not to obscure other aspects of the present disclosure.

In some embodiments, controller 620 may be a graphics processing unit (GPU) of a display device. In other embodiments, controller 620 may be other kinds of processors. The operations performed by controller 620 may include taking content for display and dividing the content into discrete sections. Controller 620 may provide to light source 642 scanning instructions that include an address corresponding to an individual source element of light source 642 and/or an electrical bias applied to the individual source element. Controller 620 may instruct light source 642 to sequentially present the discrete sections using light emitters corresponding to one or more rows of pixels in an image ultimately displayed to the user. Controller 620 may also instruct projector 650 to perform different adjustments of the light. For example, controller 620 may control projector 650 to scan the discrete sections to different areas of a coupling element of the waveguide display (e.g., waveguide display 580) as described above with respect to FIG. 5B. As such, at the exit pupil of the waveguide display, each discrete portion is presented in a different respective location. While each discrete section is presented at a different respective time, the presentation and scanning of the discrete sections occur fast enough such that a user's eye may integrate the different sections into a single image or series of images.

Image processor 630 may be a general-purpose processor and/or one or more application-specific circuits that are dedicated to performing the features described herein. In one embodiment, a general-purpose processor may be coupled to a memory to execute software instructions that cause the processor to perform certain processes described herein. In another embodiment, image processor 630 may be one or more circuits that are dedicated to performing certain features. While image processor 630 in FIG. 6 is shown as a stand-alone unit that is separate from controller 620 and driver circuit 644, image processor 630 may be a sub-unit of controller 620 or driver circuit 644 in other embodiments. In other words, in those embodiments, controller 620 or driver circuit 644 may perform various image processing functions of image processor 630. Image processor 630 may also be referred to as an image processing circuit.

In the example shown in FIG. 6, light source 642 may be driven by driver circuit 644, based on data or instructions (e.g., display and scanning instructions) sent from controller 620 or image processor 630. In one embodiment, driver circuit 644 may include a circuit panel that connects to and mechanically holds various light emitters of light source 642. Light source 642 may emit light in accordance with one or more illumination parameters that are set by the controller 620 and potentially adjusted by image processor 630 and driver circuit 644. An illumination parameter may be used by light source 642 to generate light. An illumination parameter may include, for example, source wavelength, pulse rate, pulse amplitude, beam type (continuous or pulsed), other parameter(s) that may affect the emitted light, or any combination thereof. In some embodiments, the source light generated by light source 642 may include multiple beams of red light, green light, and blue light, or any combination thereof.

Projector 650 may perform a set of optical functions, such as focusing, combining, conditioning, or scanning the image light generated by light source 642. In some embodiments, projector 650 may include a combining assembly, a light conditioning assembly, or a scanning mirror assembly. Projector 650 may include one or more optical components that optically adjust and potentially re-direct the light from light source 642. One example of the adjustment of light may include conditioning the light, such as expanding, collimating, correcting for one or more optical errors (e.g., field curvature, chromatic aberration, etc.), some other adjustments of the light, or any combination thereof. The optical components of projector 650 may include, for example, lenses, mirrors, apertures, gratings, or any combination thereof.

Projector 650 may redirect image light via its one or more reflective and/or refractive portions so that the image light is projected at certain orientations toward the waveguide display. The location where the image light is redirected toward the waveguide display may depend on specific orientations of the one or more reflective and/or refractive portions. In some embodiments, projector 650 includes a single scanning mirror that scans in at least two dimensions. In other embodiments, projector 650 may include a plurality of scanning mirrors that each scan in directions orthogonal to each other. Projector 650 may perform a raster scan (horizontally or vertically), a bi-resonant scan, or any combination thereof. In some embodiments, projector 650 may perform a controlled vibration along the horizontal and/or vertical directions with a specific frequency of oscillation to scan along two dimensions and generate a two-dimensional projected image of the media presented to user's eyes. In other embodiments, projector 650 may include a lens or prism that may serve similar or the same function as one or more scanning mirrors. In some embodiments, image source assembly 610 may not include a projector, where the light emitted by light source 642 may be directly incident on the waveguide display.

In semiconductor LEDs, photons are usually generated at a certain internal quantum efficiency through the recombination of electrons and holes within an active region (e.g., one or more semiconductor layers), where the internal quantum efficiency is the proportion of the radiative electron-hole recombination in the active region that emits photons. The generated light may then be extracted from the LEDs in a particular direction or within a particular solid angle. The ratio between the number of emitted photons extracted from an LED and the number of electrons passing through the LED is referred to as the external quantum efficiency, which describes how efficiently the LED converts injected electrons to photons that are extracted from the device.

The external quantum efficiency may be proportional to the injection efficiency, the internal quantum efficiency, and the extraction efficiency. The injection efficiency refers to the proportion of electrons passing through the device that are injected into the active region. The extraction efficiency is the proportion of photons generated in the active region that escape from the device. For LEDs, and in particular, micro-LEDs with reduced physical dimensions, improving the internal and external quantum efficiency and/or controlling the emission spectrum may be challenging. In some embodiments, to increase the light extraction efficiency, a mesa that includes at least some of the layers of semiconductor materials may be formed.

Figure 7:
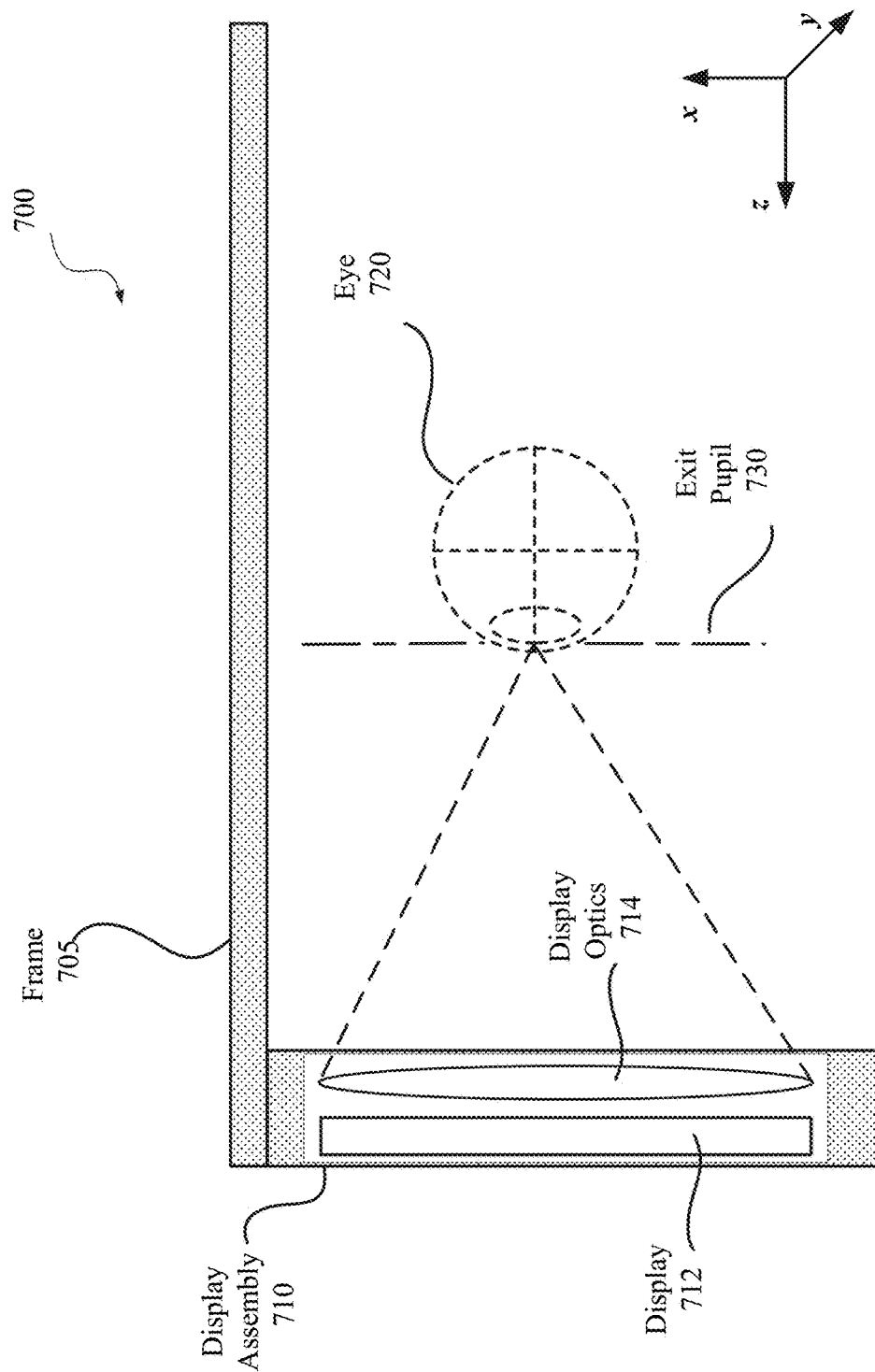
FIG. 7 is a cross-sectional view of an example of a near-eye display system according to certain embodiments.

FIG. 7 is a cross-sectional view of an example of a near-eye display system 700 according to certain embodiments. Near-eye display system 700 may include at least one display assembly 710. Display assembly 710 may be configured to direct image light (i.e., display light) to an eyebox located at exit pupil 730 of near-eye display system 700 and to user's eye 720. It is noted that, even though FIG. 7 and other figures in the present disclosure show an eye of a user of a near-eye display system for illustration purposes, the eye of the user is not a part of the corresponding near-eye display system.

As HMD device 200 and near-eye display system 300, near-eye display system 700 may include a frame 705 and a display assembly 710 that includes a display 712 and/or display optics 714 coupled to or embedded in frame 705. As described above, display 712 may display images to the user electrically (e.g., using LCD) or optically (e.g., using a waveguide display and optical couplers as described with respect to FIG. 4) according to data received from a console, such as console 110. Display 712 may include sub-pixels to emit light of a predominant color, such as red, green, blue, white, or yellow. In some embodiments, display assembly 710 may include a stack of one or more waveguide displays including, but not restricted to, a stacked waveguide display, a varifocal waveguide display, etc. The stacked waveguide display may include a polychromatic display (e.g., a red-green-blue (RGB) display) created by stacking waveguide displays whose respective monochromatic sources are of different colors. The stacked waveguide display may also be a polychromatic display that can be projected on multiple planes (e.g. multi-planar colored display). In some configurations, the stacked waveguide display may be a monochromatic display that can be projected on multiple planes (e.g. multi-planar monochromatic display). The varifocal waveguide display is a display that can adjust a focal position of image light emitted from the waveguide display. In alternate embodiments, display assembly 710 may include the stacked waveguide display and the varifocal waveguide display.

Display optics 714 may be similar to display optics 124 and may display image content optically (e.g., using optical waveguides and optical couplers), or may correct optical errors associated with the image light, combine images of virtual objects and real objects, and present the corrected image light to exit pupil 730 of near-eye display system 700, where the user's eye 720 may be located at. Display optics 714 may also relay the image generated by display 712 to create virtual images that appear to be away from the image source and further than just a few centimeters away from the eyes of the user. For example, display optics 714 may collimate light from the image source or project the displayed image to create a virtual image that may appear to be far away and convert spatial information of the displayed virtual objects into angular information. Display optics 714 may also magnify the image source to make the image appear larger than the actual size of the image source.

There may be several types of eye measurements for determining user intent, cognitive processes, behavior, attention, etc. These measurements may include, for example, measurement related to fixations, where the eyes are stationary between movements and visual input may occur. Fixation-related measurement variables may include, for example, total fixation duration, mean fixation duration, fixation spatial density, number of areas fixated, fixation sequences, and fixation rate. The eye measurements may also include measurements of saccades, which are rapid eye movements that occur between fixations. Saccade related parameters may include, for example, saccade number, amplitude, velocity, acceleration, and fixation-saccade ratio. The eye measurements may also include measurements of scanpath, which may include a series of short fixations and saccades alternating before the eyes reach a target location on the display screen. Movement measures derived from scanpath may include, for example, scanpath direction, duration, length, and area covered. The eye movement measurements may further include measuring the sum of all fixations made in an area of interest before the eyes leave that area or the proportion of time spent in each area. The eye measurements may also include measuring pupil size and blink rate, which may be used to study cognitive workload.

In addition, as described above, in an artificial reality system, to improve user interaction with presented content, the artificial reality system may track the user's eye and modify or generate content based on a location or a direction in which the user is looking. Tracking the eye may include tracking the position and/or shape of the pupil and/or the cornea of the eye, and determining the rotational position or gaze direction of the eye. One technique (referred to as Pupil Center Corneal Reflection or PCCR method) involves using MR LEDs to produce glints on the eye cornea surface and then capturing images/videos of the eye region. Gaze direction can be estimated from the relative movement between the pupil center and glints.

Figure 8:
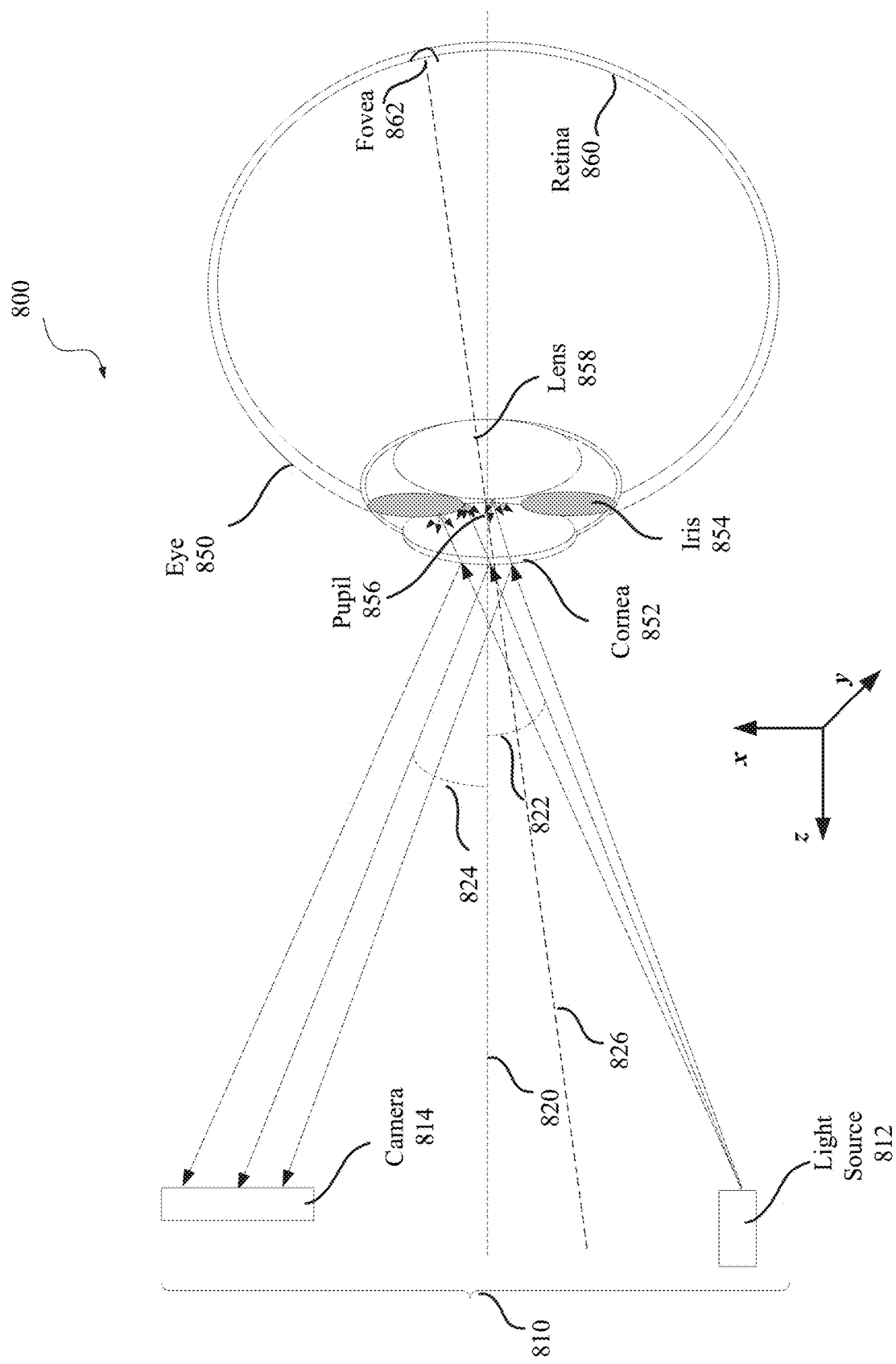
FIG. 8 illustrates light reflections and scattering by an eye during eye tracking.

FIG. 8 illustrates light reflections and scattering 800 by an eye 850 during eye tracking using an eye-tracking system 810, which may be included in eye-tracking unit 130. Eye-tracking system 810 may include a light source 812 and a camera 814 as described above. In other embodiments, eye-tracking system 810 may include different and/or additional components than those depicted in FIG. 8. Light source 812 may include, for example, a laser, an LED, or VCSELs, and may be mounted at a laser angle 822 relative to a surface normal vector 820 of eye 850. Surface normal vector 820 is orthogonal to a portion of the surface (e.g., cornea 852) of eye 850 illuminated by light source 812. In the example shown in FIG. 8, surface normal vector 820 may be the same as the pupillary axis (also referred to as optical axis, which may be a line passing through the center of pupil 856 and the center of cornea 852) of eye 850. Laser angle 822 may be measured between surface normal vector 820 and a line from a center of the portion of the surface of eye 850 illuminated by light source 812 to a center of the output aperture of light source 812. Camera 814 may be mounted at a camera angle 824 relative to surface normal vector 820 of eye 850. Camera angle 824 may be measured between surface normal vector 820 and a line from a center of the portion of the surface of eye 850 illuminated by light source 812 to a center of the image sensor or light input aperture of camera 814. In some embodiments, a difference between laser angle 822 and camera angle 824 is less than a threshold amount so that camera 814 may capture images via specular reflections of light incident on cornea 852 of eye 850, which may beneficially increase contrast of the resulting image and minimize light power loss and power consumption.

The light emitted by light source 812 may substantially uniformly illuminate a portion of the eye surface (e.g., cornea 852). A portion of the emitted light may be reflected specularly by cornea 852 of eye 850 and captured by camera 814. In some cases, the light incident on eye 850 may propagate into the eye for a small distance before being reflected. For example, at least some portions of the light may enter eye 850 through cornea 852 and reach iris 854, pupil 856, lens 858, or retina 860 of eye 850. Because some interfaces within eye 850 (e.g., surface of iris 854) may be rough (e.g., due to features such as capillaries or bumps), the interfaces within eye 850 may scatter the incident light in multiple directions. Different portions of the eye surface and the interfaces within eye 850 may have different patterns of features. Thus, an intensity pattern of the light reflected by eye 850 may depend on the pattern of features within the illuminated portion of eye 850, which may allow identification of the portions of the eye (e.g., iris 854 or pupil 856) from the intensity pattern.

Camera 814 may collect and project light reflected by the illuminated portion of eye 850 onto an image sensor of camera 814. Camera 814 may also correct one or more optical errors (such as those described with respect to the display optics 124) to improve the contrast and other properties of the images captured by the image sensor of camera 814. In some embodiments, camera 814 may also magnify the reflected light. In some embodiments, camera 814 may enlarge the images. The image sensor of camera 814 may capture incident light focused by a lens assembly of camera 814. Thus, camera 814 may effectively capture an image of light source 812 (the emitted light of which is reflected specularly by the cornea of the eye) reflected by the eye, resulting in a "glint" in the captured image. Because of the scattering (diffusive reflections) at some interfaces of the eye, light incident on a point of the image sensor may include light reflected from multiple points within the illuminated portion of eye 850, and thus may be the result of the interference of the light reflected from the multiple points. Thus, in some embodiments, the image sensor of camera 814 may also capture a diffraction or speckle pattern formed by a combination of light reflected from multiple points of the surface of eye 850.

Each pixel of the image sensor may include a light-sensitive circuit that can output a current or voltage signal corresponding to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 814 may include a complementary metal-oxide semiconductor (CMOS) pixel array, which may be used with light having a wavelength less than about 850 nm. As another example, the image sensor of camera 814 may include an indium gallium arsenide (InGaAs) alloy pixel array or a charge-coupled device (CCD). Such an image sensor may be used with a laser emitting light having a wavelength between about 900 nm and about 1160 nm.

In some embodiments, to determine a position change of eye 850, an eye-tracking module (e.g., eye-tracking unit 130 or eye-tracking module 118 of FIG. 1) may determine a pixel shift between images. Multiplying the pixel shift by a calibrated distance per pixel may allow the eye-tracking module to determine a distance the surface (e.g., cornea 852) of eye 850 has shifted. For example, if the glint captured in one image is shifted by two pixels relative to the glint captured in a previous image, and each pixel corresponds to a distance of 10 micrometers at the surface of eye 850, the surface of eye 850 may have moved about 20 micrometers.

In some embodiments, eye-tracking techniques used in head-mounted devices may be video-based and may be performed based on appearance or features. For example, the appearance-based techniques may use certain mapping functions to map the entire eye image or a region of interest of the eye image to a gaze direction or point-of-gaze. The mapping function may have a high-dimensional input (e.g., the intensities of image pixels) and a low-dimensional output (e.g., the gaze direction, point-of-gaze, etc.). These mapping functions may be based on machine learning models, such as convolutional neural networks (CNNs).

The feature-based techniques may perform feature extraction and gaze estimation using the extracted features. The features can be any one or more of the following: pupil center, iris center, pupil-iris boundary, iris-sclera boundary, first Purkinje images (reflections off the front surface of the cornea, known as corneal reflections or glints), fourth Purkinje images (reflections of the back surface of the crystalline lens), eye corners, and the like. These features may be extracted using computer vision techniques (e.g., intensity histogram analysis, thresholding, edge detection, blob segmentation, convex-hull, morphological operations, shape fitting, deformable templates, centroiding, etc.) or machine-learning techniques, or any combination. The gaze estimation techniques can be interpolation-based or model-based. The interpolation-based techniques may use certain mapping functions (e.g., second degree bivariate polynomial) to map eye features (e.g., pupil center or pupil center-corneal reflection (PCCR) vector) to the gaze direction. The coefficients of these mapping functions may be obtained through a personal calibration procedure that may involve collecting data while the user fixates at a sequence of fixation targets with known coordinates. This calibration may be performed for each subject and each session, and may sometimes be performed multiple times in each session, because the calibration may be sensitive to slippage of the head-mounted device relative to the head. The mapping functions may then use the calibration data points and interpolation techniques to determine the gaze direction. The model-based methods may use models of the system (e.g., camera(s) and/or light source(s)) and the eye that may include actual physical system parameters and anatomical eye parameters to determine a 3-D gaze from a set of eye features (e.g., pupil boundary and multiple corneal reflections) according to 3-D geometry. Model-based techniques may perform both a one-time system calibration and a one-time personal calibration for each user. The data collection procedure for the personal calibration may be similar to that of the interpolation-based methods.

Alternatively or additionally, the eye-tracking module may determine the position of the eye in a captured image by comparing the captured images with one or more previous images having known positions of the eye. For example, the eye-tracking module may include a database of images that are each associated with a reference eye position. By matching the captured image with a stored image, the eye-tracking module may determine that the eye is at the reference eye position associated with the stored image. In some embodiments, the eye-tracking module may identify a feature in a portion of a captured image. The feature may include a diffraction or optical flow pattern associated with a particular portion of eye 850, such as the pupil or the iris. For example, the eye-tracking module may determine the eye position by retrieving a reference eye position associated with the feature (which was also captured in a reference image), determining a pixel shift between the feature in the captured image and the feature in the reference image, and determining the eye position based on the determined pixel shift with respect to the reference eye position and the calibrated distance per pixel as described above.

As discussed above, camera 814 may effectively capture an image of light source 812 reflected by cornea 852 of eye 850. In some embodiments, the eye-tracking module may determine a gaze direction of the user's eye based on the locations of the images of the light sources (e.g., glints) on cornea 852 in the captured image. The gaze direction may be determined by a foveal axis 826 of the user's eyes, where foveal axis 826 (also referred to as "visual axis") may be a line passing through the center of pupil 856 and the center of fovea 862.

Figure 9:
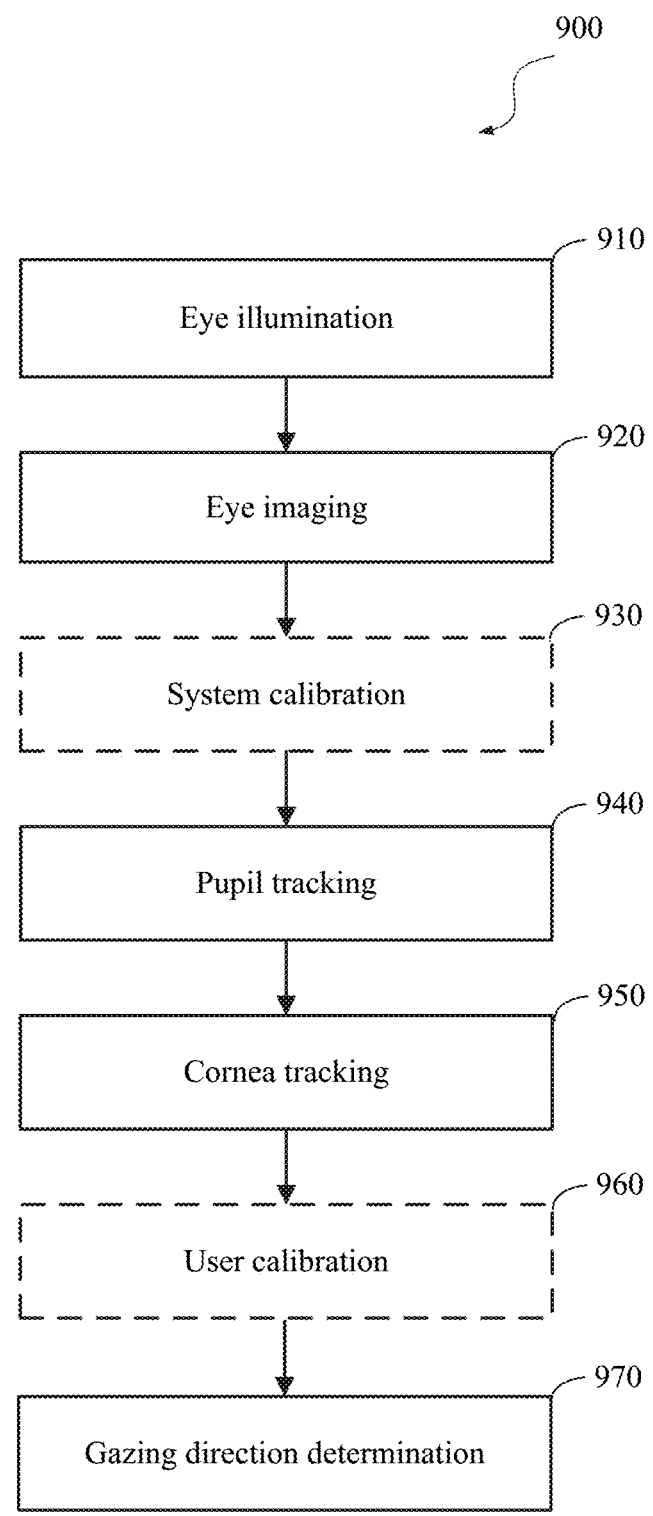
FIG. 9 is a simplified flowchart illustrating an example of a method for tracking the eye of a user of a near-eye display system according to certain embodiments.

FIG. 9 is a simplified flowchart 900 illustrating an example method for tracking the eye of a user of a near-eye display system according to certain embodiments. The operations in flowchart 900 may be performed by, for example, eye-tracking unit 130 or eye-tracking system 810 described above. At block 910, one or more light sources may illuminate the user's eye. In various embodiments, the light sources may be in the field of view of the user's eye or at a periphery of the field of view of the user's eye. In some embodiments, a light source may be located at the periphery of the field of view of the user's eye, and the light from the light source may be guided and directed to the user's eye from locations in the field of view of the user's eye.

At block 920, an imaging device (e.g., a camera) may collect light reflected by the user's eye and generate one or more images of the user's eye. As described above, the cornea of the user's eye may specularly reflect the illumination light, while some portions of the user's eye (e.g., iris) may diffusively scatter the illumination light. The images of the user's eye may include portions (e.g., the iris region and/or the pupil portion) where the contrast may be different due to the scattering of the illumination light. The images of the user's eye may also include glints caused by the specular reflection of the illumination light by the user's cornea.

Figures 10A, 10B:
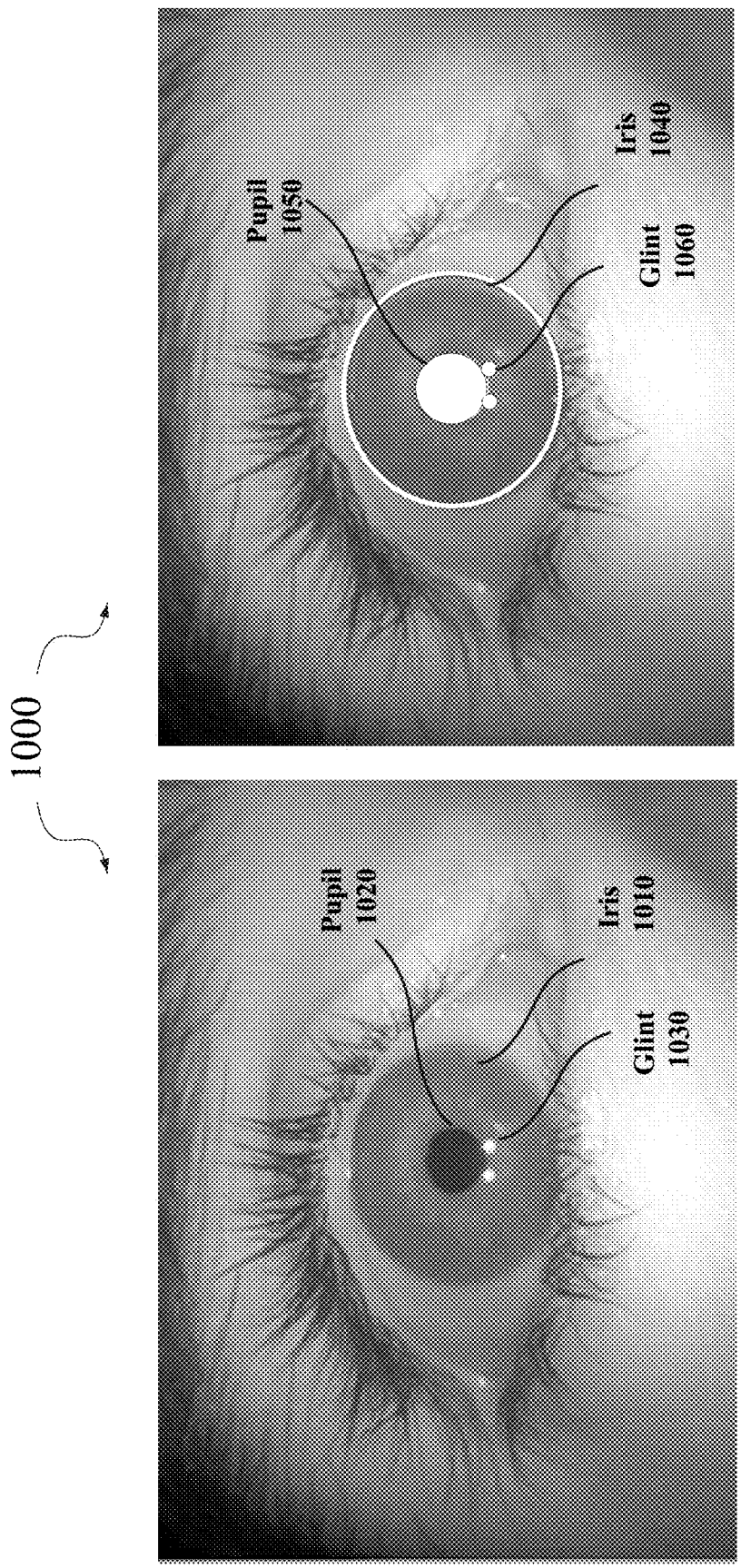
FIG. 10A illustrates an example of an image of a user's eye captured by a camera according to certain embodiments.
FIG. 10B illustrates an example of an identified iris region, an example of an identified pupil region, and examples of glint regions identified in an image of the user's eye according to certain embodiments.

FIG. 10A illustrates an example of an image 1000 of a user's eye captured by a camera according to certain embodiments. Image 1000 includes an iris region 1010, a pupil region 1020, and multiple glints 1030. Glints 1030 may be caused by illumination light specularly reflected off the cornea of the user's eye.

Optionally, at block 930, the eye-tracking system may perform system calibration to improve the precision and accuracy of the eye tracking as described above with respect to eye-tracking module 118. The system calibration may include, for example, calibrating the eye tracking optical path (such as extrinsic (e.g., position or orientation) and intrinsic camera parameters), positions of the light sources, the display optical path (e.g., position of the display, extrinsic and intrinsic parameters of the display optics, etc.)

At block 940, the location of the center of the pupil of the user's eye may be determined based on the scattering of the illumination light by, for example, the iris of the user's eye. As described above, the boundaries of the pupil and/or the iris may be determined based on image segmentation of the pupil region in the captured image as shown in FIG. 10A. Based on the boundaries of the pupil, the location of the center of the pupil may be determined.

At block 950, the position of the cornea of the user's eye may be determined based on the locations of the glints in the captured image of the user's eye as shown in FIG. 10A. As described above, the locations of the glints may be determined using, for example, a Gaussian centroiding technique. The accuracy and precision of the determined locations of the glints may depend on the locations of the light sources (or virtual or effective light sources). Based on the locations of two or more glints, the position of the cornea may be determined using, for example, nonlinear optimization and based on the assumption that the cornea (in particular, the corneal apex) is close to a sphere.

FIG. 10B illustrates an example of an identified iris region 1040, an example of an identified pupil region 1050, and examples of glint regions 1060 identified in image 1000 of the user's eye according to certain embodiments. As illustrated, edges of iris region 1040 and pupil region 1050 are identified. The center of pupil region 1020 may then be determined based on the edges of pupil region 1050 and/or iris region 1040. The locations of glints 1030 can also be determined based on the locations of glint regions 1060 identified in image 1000. Based on the locations of glint regions 1060, the position of the center of the cornea may be determined.

Optionally, at block 960, the eye-tracking system may perform user calibration to determine certain eye calibration parameters for improving the precision and accuracy of eye tracking as described above with respect to eye-tracking module 118 and FIG. 8. The user calibration may include, for example, determining the eye model parameters (e.g., anatomical eye parameters) or the coefficients of some mapping functions that may not depend on a particular eye parameter. Other examples of the eye calibration parameters may include an estimated average eye radius, an average corneal radius, an average sclera radius, a map of features on the eye surface, and an estimated eye surface contour. As described above, a kappa angle between the pupillary axis (optical axis) and the foveal axis (visual axis) of the use's eye may be different for different users, and thus may need to be calibrated during the calibration. In some embodiments, the calibration may be performed by displaying a set of target points distributed over a display screen according to a certain pattern, and the user is asked to gaze at each of the target points for a certain amount of time. The camera may capture the corresponding eye positions for the target points, which are then mapped to the corresponding gaze coordinates or directions, and the eye-tracking system may then learn the mapping function or the model parameters. In some embodiments, the calibrations at block 930 and 960 may only be performed once when the near-eye display system is put on or moved.

At block 970, the gaze direction of the user's eye may be determined based on, for example, the location of the center of the pupil and the position of the center of the cornea. In some embodiments, the pupillary axis of the use's eye may be determined first and may then be used to determine the foveal axis (or line of sight, gaze direction, or visual axis) of the user's eye, for example, based on an angle between the pupillary axis and the foveal axis.

Based on the gaze direction (and thus the center of the field of view) of the user's eye and the sensitivity of human eyes at different regions of the retina, the display system may determine the luminance levels for the individual light sources in different display zones of the display system that correspond to different zones on the retina of a user's eye. The individual light sources in the different display zones may then be controlled to emit at the different luminance levels. As described above, human eyes are generally less sensitive to light from large viewing angles with respect to the foveal axis. The sensitivity may peak at the foveal zone and quickly decrease outside of the foveal zone. Therefore, display zones of a display panel that may be imaged onto regions of the retina farther away from the fovea may not be very noticeable to a user's eye even if these display zones have high luminance levels or high light intensities. As such, light sources (e.g., micro-LEDs or AMOLEDs) in these display zones may be controlled to emit light at lower luminance levels to reduce the power consumption of the display system, with no or minimum impact on the user experience. Light sources in a display zone that may be imaged onto a zone of the retina including the fovea may be controlled to emit at a higher luminance level (or brightness). By reducing the luminance levels of the light sources in some display zones of the display panel that may have less impact on user experience, the power consumption of the display system can be reduced.

Figure 11:
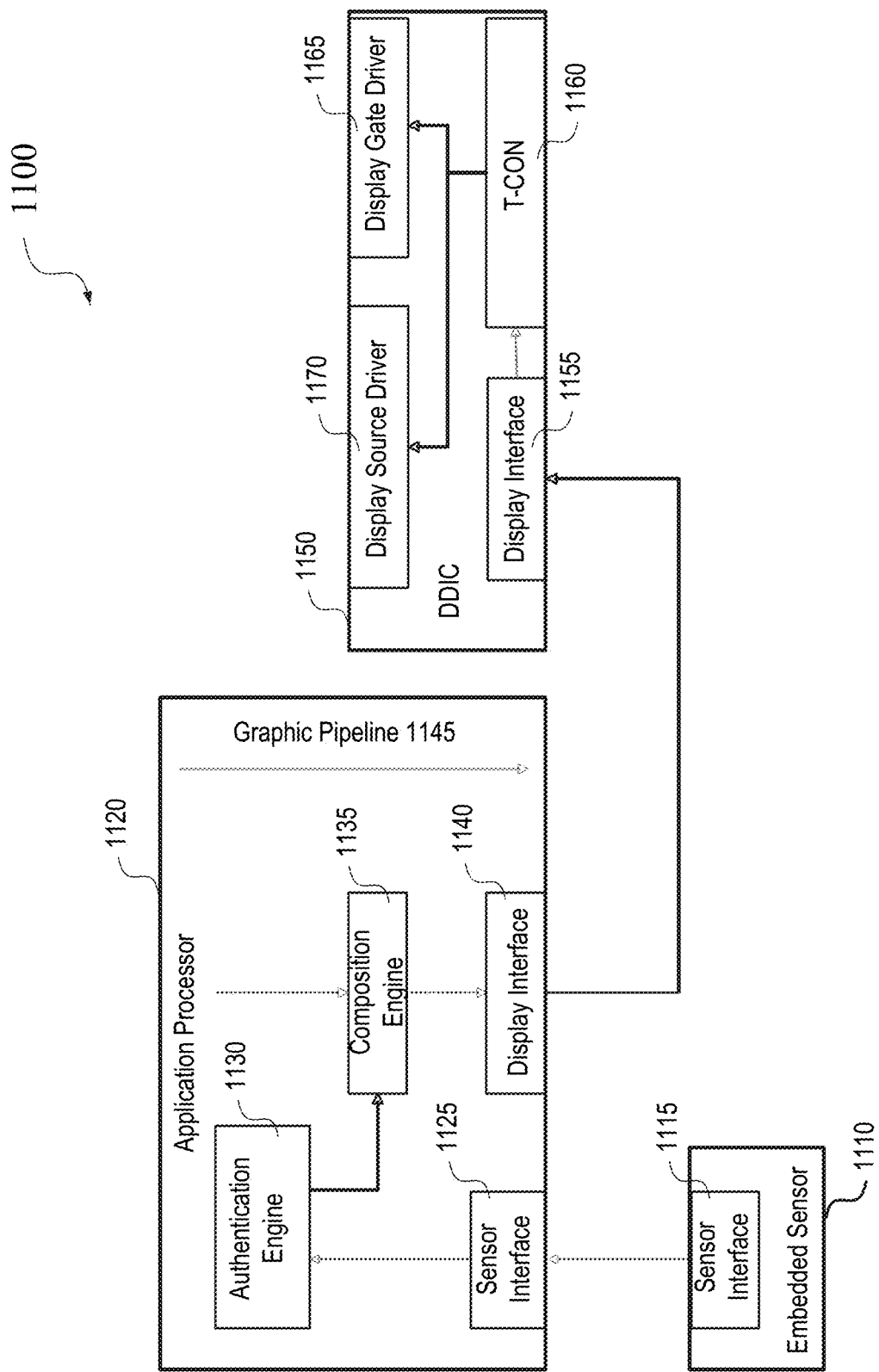
FIG. 11 is a simplified block diagram of an example of a controller for a near-eye display system according to certain embodiments.

FIG. 11 is a simplified block diagram of an example of a controller 1100 for a near-eye display system according to certain embodiments. The controller 1100 may be incorporated within the artificial reality engine 116 described above. The controller 1100 may include an application processor 1120 and a display driver integrated circuit (DDIC) 1150. The controller 1100 may receive data from an embedded sensor 1110 having a sensor interface 1115. The embedded sensor 1110 may be incorporated within the eye-tracking unit 130 and/or the eye-tracking system 810 described above. The embedded sensor 1110 may use the method illustrated by flowchart 900 to track the position and the gaze direction (and the center of the field of view) of an eye of a user of the near-eye display system. The embedded sensor 1110 may also perform a user calibration to determine the location of a foveal axis and other characteristics of the eye of the user as described above.

The sensor interface 1115 of the embedded sensor 1110 may transmit eye-tracking and/or user calibration data to a sensor interface 1125 of the application processor 1120. The sensor interface of the application processor 1120 may then send the data to an authentication engine 1130, which may analyze the data to determine whether the data is accurate. If the authentication engine 1130 determines that the data is accurate, the authentication engine 1130 may route the data through a composition engine 1135 and a display interface 1140 via a graphics pipeline 1145. In some embodiments, the composition engine 1135 may use the data to determine a map for driving the light sources in the display as discussed in more detail below. For example, the composition engine 1135 may maintain a lookup table that specifies the luminance bands for different zones (e.g., based on the distances and/or the relative positions of the different zones from a maximum luminance location), and may use the lookup table and the center of the field of view of the user's eye to determine a map that indicates the luminance bands for different display zones of the display panel of the display system. In some embodiments, the DDIC 1150 may use the data to determine the map for driving the light sources in the display. The display interface 1140 may send the data and/or the map to a display interface 1155 of the DDIC 1150.

The display interface 1155 of the DDIC 1150 may send the data and/or the map to a timing controller (T-CON) 1160. The timing controller 1160 may use the data and/or the map to provide instructions to a display gate driver 1165 and a display source driver 1170, which may drive the light sources in the display to emit light at luminance levels according to the map. For example, display source driver 1170 and/or display gate driver 1165 may perform gamma correction (e.g., apply display gamma to correct or offset image gamma) and provide drive currents or voltages to the light sources, based on the luminance bands for the display zones and transfer functions between input display values (e.g., gray levels or drive levels) and luminance levels for the different display zones as discussed in detail below.

Figure 12B:
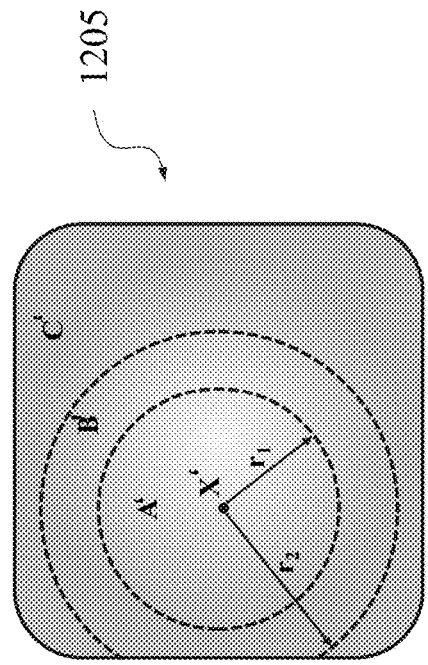
FIGS. 12A-12D illustrate examples of methods for driving light sources in a display system according to certain embodiments.
Figure 12A:
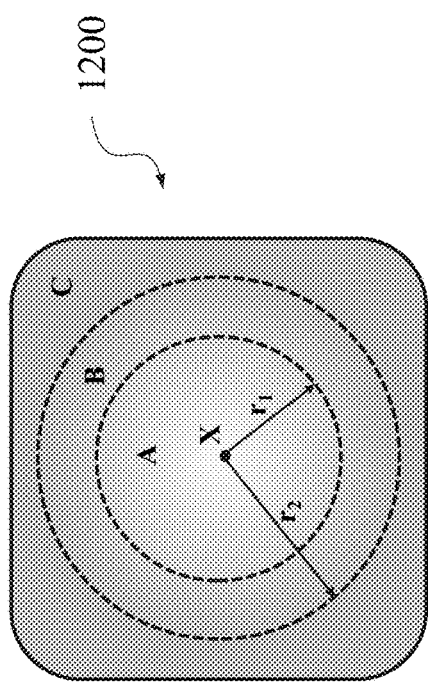

FIGS. 12A-12D illustrate examples of methods for driving light sources within a display according to certain embodiments. FIG. 12A is a diagram of an example of a luminance pattern 1200 for a display according to certain embodiments. The display may include a two-dimensional array of individual light sources, such as micro-LEDs or AMOLEDs. The light sources may be controlled by respective driver circuits to emit light at desired luminance levels. As shown in FIG. 12A, the luminance pattern 1200 may include multiple zones, such as a first zone A, a second zone B, and a third zone C. Although three zones are shown in the example in FIG. 12A, any number of zones greater than one may be used. In the example shown in FIG. 12A, the zones may be arranged such that there is a maximum luminance location X at the center of the display, with the luminance level decreasing toward the edges of the display. The zones may be defined based on their locations with respect to the maximum luminance location X. In some embodiments, the zones may be defined based on their distances from the maximum luminance location X. For example, as shown in FIG. 12A, the first zone A may include light sources that are within a first radius $r_1$ from the maximum luminance location X, the second zone B may include light sources that are in a ring having an inner radius $r_1$ and an outer radius $r_2$, and the third zone C may include light sources that are at a distance greater than the second radius $r_2$ from the maximum luminance location X, where the first radius $r_1$ and the second radius $r_2$ originate at the maximum luminance location X. In some embodiments, the zones may be characterized by various alternative shapes, such as ovals, squares, and/or rectangles.

The maximum luminance location X may be at the center of the field of view of the user's eye, on the foveal axis of the user's eye, or within a field of view of the fovea of the user's eye, such that location X may be imaged onto the fovea of the retina of the user's eye. In the example shown in FIG. 12A, the center of the field of view of the user's eye may be at the center of the display, and thus the maximum luminance location X may be at the center of the display. In some embodiments, the characteristics of the user's eye (e.g., the foveal axis, optical axis, and/or field of view) may be determined based on the characteristics of average human eye. Alternatively, the characteristics of a user's eye may be determined based on various measurements, such as the user calibration methods described above.

FIG. 12B is a diagram of another example of a luminance pattern 1205 for a display according to certain embodiments. As shown in FIG. 12B, the luminance pattern 1205 may include multiple zones, such as a first zone A', a second zone B', and a third zone C'. Although three zones are shown in FIG. 12B, any number of zones greater than one may be used. In the example shown in FIG. 12B, the zones may be arranged such that there is a maximum luminance location X' at the center of the field of view of the user's eye, with the luminance decreasing toward the edges of the display. The center of the field of view of the user's eye may be determined using the eye-tracking methods to determine the position and/or the gaze direction of the user's eye as described above with respect to, for example, FIG. 9. In the example shown in FIG. 12B, the center of the field of view of the user has shifted to the left side of the display as compared with the example shown in FIG. 12A. Thus, the maximum luminance location X' may shift to the left side of the display correspondingly to coincide with the center of the field of view of the user's eye. The different display zones may be determined based on the locations of the light sources with respect to the maximum luminance location X'. In some examples, the different display zones may be determined based on the distance from the light sources to the maximum luminance location X'. For example, as shown in FIG. 12B, the first zone A' may include light sources that are within a first radius $r_1$ from the maximum luminance location X', the second zone B' may include light sources that are in a ring having an inner radius $r_1$ and an outer radius $r_2$, and the third zone C' may include light sources that are at a distance greater than the second radius $r_2$ from the maximum luminance location X', where the first radius $r_1$ and the second radius $r_2$ originate at the maximum luminance location X'. In some embodiments, the different display zones may be characterized by various alternative shapes, such as ovals, squares, and/or rectangles.

The maximum luminance location X' may be on the foveal axis of the user's eye. In some embodiments, the maximum luminance location X' may be within a field of view of the fovea of the user's eye. The characteristics (e.g., the field of view) of the user's eye may be determined by the eye-tracking methods and/or the user calibration methods described above. The maximum luminance location X' may be determined, for example, when the user first puts on the near-eye display. Alternatively or additionally, the maximum luminance location X' may be determined at various subsequent times, such as when the location and/or the gaze direction of the user's eye changes.

Figure 12D:
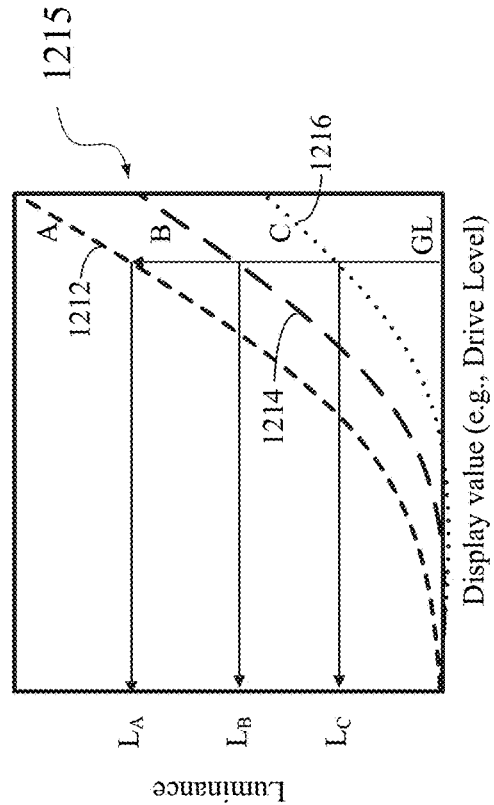
Figure 12C:
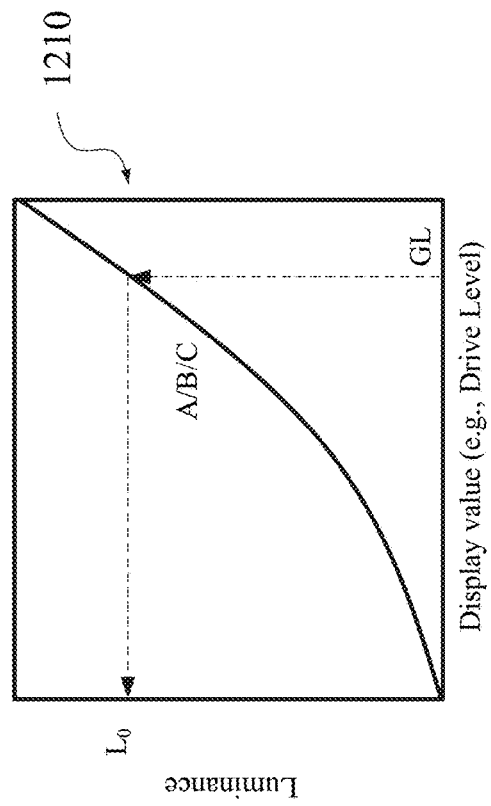

FIG. 12C is a graph 1210 illustrating a transfer function between the luminance level and the display value (e.g., tone, gray level, or drive level) for light sources in a display system. Graph 1210 may be an example of a transfer function for light sources that emit red, green, blue, or white light. The horizontal axis of graph 1210 is the input display value, which may be, for example, a gray level or a drive level, such as an integer between 0 and 255 that indicates a drive voltage or current level within a drive voltage or current range. The transfer function may not be a linear function and may be characterized by a gamma value.

In the illustrated example, the transfer function may be the same for light sources in the first zone A, the second zone B, and the third zone C. Thus, a display value for any light source within the display may result in the driving of the light sources to emit at approximately the same luminance level. For example, a display value GL for any light source within the display may result in driving the light source to emit at approximately a same luminance $L_0$, regardless of the location of the light source within the display. In other words, the luminance level of any light source receiving the same display value may be approximately the same. More specifically, the transfer function of the luminance as a function of the display value is the same for light sources in the first zone A, the second zone B, and the third zone C. Therefore, selecting the drive value GL for any light source within the display may result in driving the light source to emit light at a same luminance $L_0$, regardless of whether the light source is within the first zone A, the second zone B, or the third zone C.

FIG. 12D is a graph 1215 illustrating the transfer functions between the luminance level and the display value (e.g., tone, gray level, or drive level) for light sources in a display according to certain embodiments. In the example shown in FIG. 12D, different transfer functions may be used for light sources in different zones. For example, a transfer function for light sources in the first zone A (or A') may be shown by a curve 1212, a transfer function for light sources in the second zone B (or B') may be shown by a curve 1214, and a transfer function for light sources in the third zone C (or C') may be shown by a curve 1216. Curves 1212, 1214, and 1216 may correspond to different luminance bands and different gamma values.

Because of the different luminance bands and different transfer functions for light sources in different zones, a same display value for light sources within different zones may result in the driving of the light sources within different zones at different voltage and/or current levels to emit light at different luminance levels. For example, setting a display value GL for a light source within zone A or A' may result in driving the light source to emit light at a first luminance level $L_A$, setting the display value GL for a light source within zone B or B' may result in driving the light source to emit light at a second luminance level $L_B$, and setting the display value GL for a light source within zone C or C' may result in driving the light source to emit light at a third luminance level $L_C$. In this example, the first luminance $L_A$ is greater than the second luminance $L_B$, which in turn is greater than the third luminance $L_C$.

When each of the first zone A, the second zone B, and the third zone C has a respective discrete transfer function for light sources in the entire zone, a sharp change in the luminance level may occur at the boundaries between adjacent zones. In some embodiments, there may be multiple luminance bands and corresponding transfer functions for light sources in a zone, such that there may be a gradual change in the luminance level from one zone to an adjacent zone. As a result, the change in the luminance level at the boundaries of a zone may be less than a threshold value that may be noticeable by the human eyes. For example, each of the different display zones may be associated with multiple luminance bands and multiple discrete transfer functions for the multiple luminance bands. Each of the luminance bands and the discrete transfer functions may correspond to a different sub-zone within the corresponding zone. Adjacent sub-zones at the interface between adjacent zones may have identical or nearly identical luminance bands and transfer functions. For example, a sub-zone in a region just before the first radius $r_1$ in the first zone A may have a transfer function that is identical or nearly identical to a transfer function for a sub-zone just after the first radius $r_1$ in the second zone B.

In some embodiments, the gradient of luminance levels to avoid sharp changes in luminance level between adjacent zones may be achieved by performing an extrapolation based on the transfer function corresponding to the center (or another location) of a zone and the transfer function corresponding to the center (or another location) of an adjacent zone. The gradient of luminance levels may be selected such that the difference between the luminance levels of light sources in adjacent zones is less than a threshold value and thus is imperceptible by the human eyes.

The display value referenced in FIGS. 12C and 12D may be a grayscale level or drive level for white (or gray) color. The display value referenced in FIGS. 12C and 12D may also be a drive level for light sources in a color display in which each pixel includes three light sources (e.g., three OLEDs or micro-LEDs) that are configured to emit red, green, and blue light, respectively, where the light sources for each color may have a respective transfer function. For example, the driver level may be within a range from 0 to 255 for red, green, or blue color when the display value of each color is represented by an 8-bit integer.

The controller or the drive circuits (e.g., controller 1100) of a display may be configured to drive light sources within different zones of the display with different voltages and/or currents based on predetermined luminance bands (e.g., luminance ranges) and transfer functions for the different zones, such that the light sources within the different zones of the display may emit light at different luminance levels for the same display value. In some embodiments, the controller or the drive circuits may be configured to drive groups of the light sources within the display with different currents for a same display value, such that each of the light sources within a group emits light at the same luminance level, but light sources in different groups may emit light at different luminance levels. The drive voltage or current for each of the light sources within the display may be determined based on, for example, graph 1215 shown in FIG. 12D. In some examples, each light source may be an OLED or a micro-LED that can be controlled individually.

Figure 13:
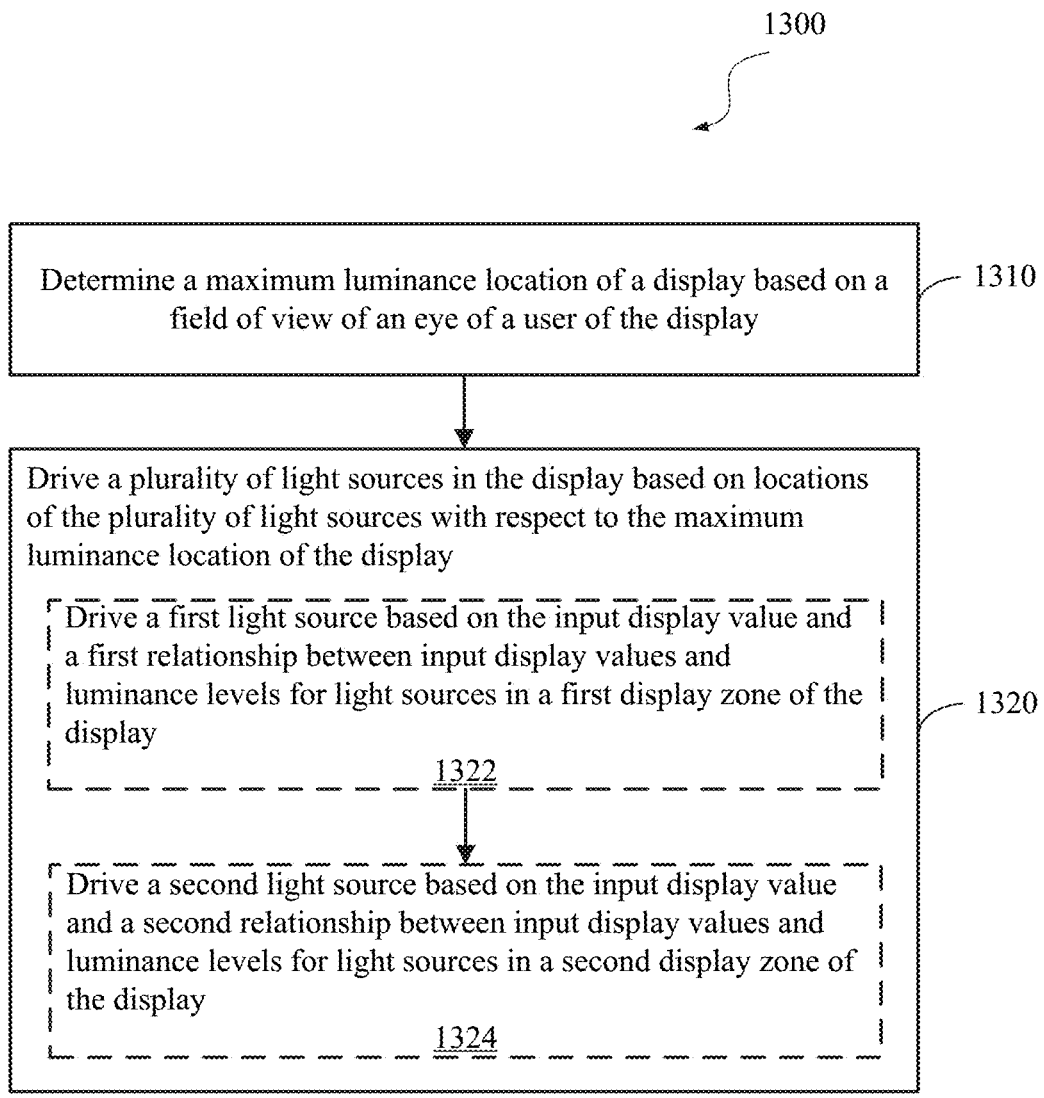
FIG. 13 is a simplified flowchart illustrating an example of a method for driving light sources in a display system according to certain embodiments.

FIG. 13 is a simplified flowchart 1300 illustrating an example of a method for driving light sources in a display system according to certain embodiments. The operations in flowchart 1300 may be performed by, for example, display electronics 122 or controller 1100 described above. Each light source in the display system may include an OLED or a micro-LED. At block 1310, a controller, such as controller 1100, may determine a maximum luminance location of a display based on a field of view of an eye of a user of the display. In some embodiments, determining the maximum luminance location of the display may include tracking the eye of the user with respect to the display. The field of view of the eye of the user may be determined based on the position of the eye of the user and/or a gaze direction of the eye of the user. In some embodiments, the maximum luminance location may be at a center of the field of view of the eye of the user. In some embodiments, the maximum luminance location may be within a field of view of a fovea of the eye of the user.

At block 1320, the controller may drive a plurality of light sources in the display based on locations of the plurality of light sources with respect to the maximum luminance location of the display. Each light source of the plurality of light sources is driven by a respective drive circuit to emit light. For a first light source and a second light source in the plurality of light sources and associated with a same input display value, the first light source may be driven to emit light at a first luminance level higher than a second luminance level of the second light source that is farther from the maximum luminance location than the first light source. For example, the controller may, at block 1322, drive the first light source based on the input display value and a first relationship between input display values and luminance levels for light sources in a first display zone of the display; and, at block 1324, drive the second light source based on the input display value and a second relationship between input display values and luminance levels for light sources in a second display zone of the display. The luminance levels for the light sources in the first display zone may be characterized by a first range larger than a second range of the luminance levels for the light sources in the second display zone. In some embodiments, a difference between the first luminance level and the second luminance level is less than a threshold value.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Figure 14:
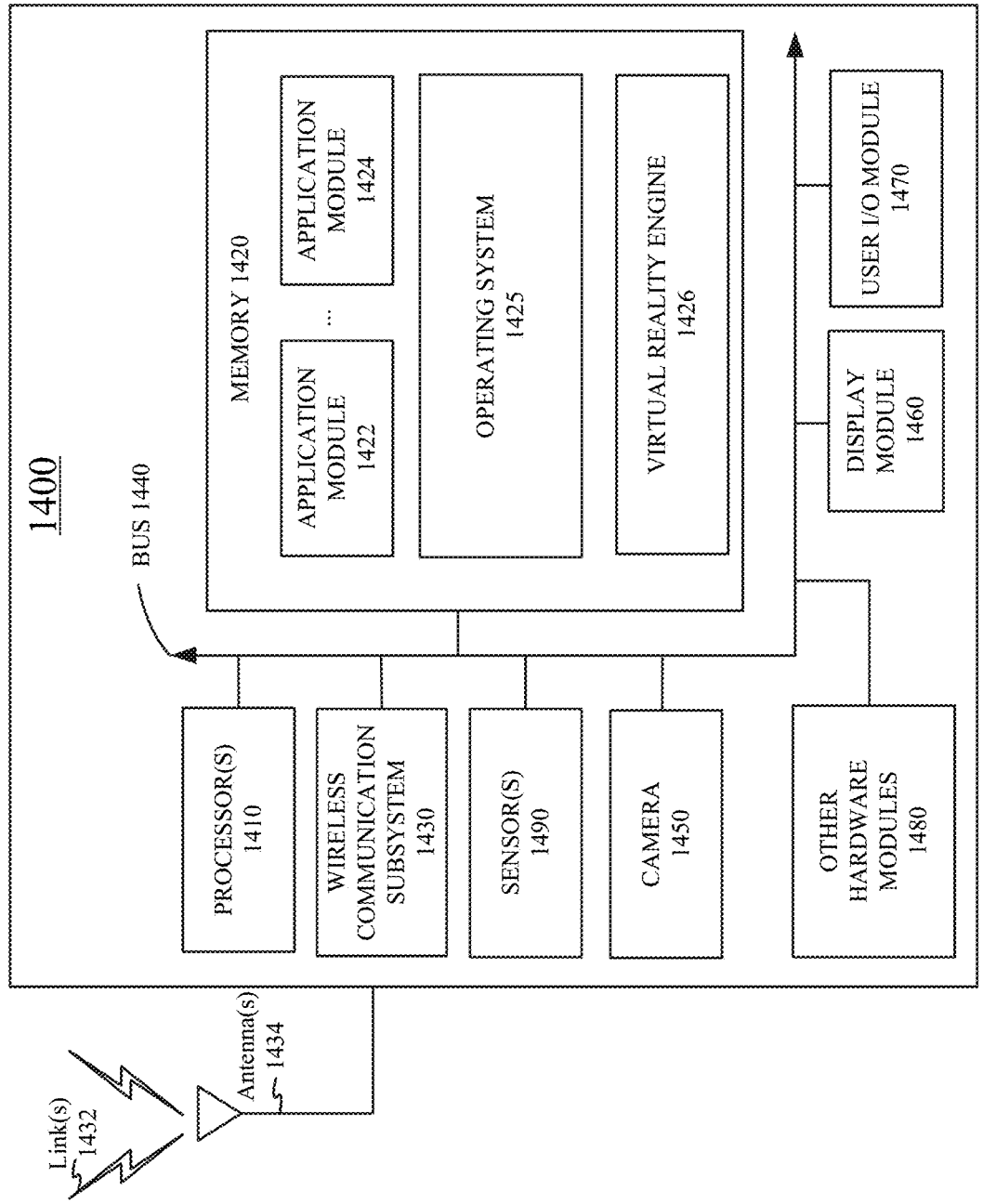
FIG. 14 is a simplified block diagram of an electronic system of an example of a near-eye display according to certain embodiments.

FIG. 14 is a simplified block diagram of an example electronic system 1400 of an example near-eye display (e.g., HMD device) for implementing some of the examples disclosed herein. Electronic system 1400 may be used as the electronic system of an HMD device or other near-eye displays described above. In this example, electronic system 1400 may include one or more processor(s) 1410 and a memory 1420. Processor(s) 1410 may be configured to execute instructions for performing operations at a plurality of components, and can be, for example, a general-purpose processor or microprocessor suitable for implementation within a portable electronic device. Processor(s) 1410 may be communicatively coupled with a plurality of components within electronic system 1400. To realize this communicative coupling, processor(s) 1410 may communicate with the other illustrated components across a bus 1440. Bus 1440 may be any subsystem adapted to transfer data within electronic system 1400. Bus 1440 may include a plurality of computer buses and additional circuitry to transfer data.

Memory 1420 may be coupled to processor(s) 1410. In some embodiments, memory 1420 may offer both short-term and long-term storage and may be divided into several units. Memory 1420 may be volatile, such as static random-access memory (SRAM) and/or dynamic random-access memory (DRAM) and/or non-volatile, such as read-only memory (ROM), flash memory, and the like. Furthermore, memory 1420 may include removable storage devices, such as secure digital (SD) cards. Memory 1420 may provide storage of computer-readable instructions, data structures, program modules, and other data for electronic system 1400. In some embodiments, memory 1420 may be distributed into different hardware modules. A set of instructions and/or code might be stored on memory 1420. The instructions might take the form of executable code that may be executable by electronic system 1400, and/or might take the form of source and/or installable code, which, upon compilation and/or installation on electronic system 1400 (e.g., using any of a variety of generally available compilers, installation programs, compression/decompression utilities, etc.), may take the form of executable code.

In some embodiments, memory 1420 may store a plurality of application modules 1422 through 1424, which may include any number of applications. Examples of applications may include gaming applications, conferencing applications, video playback applications, or other suitable applications. The applications may include a depth sensing function or eye tracking function. Application modules 1422-1424 may include particular instructions to be executed by processor(s) 1410. In some embodiments, certain applications or parts of application modules 1422-1424 may be executable by other hardware modules 1480. In certain embodiments, memory 1420 may additionally include secure memory, which may include additional security controls to prevent copying or other unauthorized access to secure information.

In some embodiments, memory 1420 may include an operating system 1425 loaded therein. Operating system 1425 may be operable to initiate the execution of the instructions provided by application modules 1422-1424 and/or manage other hardware modules 1480 as well as interfaces with a wireless communication subsystem 1430 which may include one or more wireless transceivers. Operating system 1425 may be adapted to perform other operations across the components of electronic system 1400 including threading, resource management, data storage control and other similar functionality.

Wireless communication subsystem 1430 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1400 may include one or more antennas 1434 for wireless communication as part of wireless communication subsystem 1430 or as a separate component coupled to any portion of the system. Depending on desired functionality, wireless communication subsystem 1430 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1430 may permit data to be exchanged with a network, other computer systems, and/or any other devices described herein. Wireless communication subsystem 1430 may include a means for transmitting or receiving data, such as identifiers of HMD devices, position data, a geographic map, a heat map, photos, or videos, using antenna(s) 1434 and wireless link(s) 1432. Wireless communication subsystem 1430, processor(s) 1410, and memory 1420 may together comprise at least a part of one or more of a means for performing some functions disclosed herein.

Embodiments of electronic system 1400 may also include one or more sensors 1490. Sensor(s) 1490 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1490 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or any combination thereof. The position sensors may be located external to the IMU, internal to the IMU, or any combination thereof. At least some sensors may use a structured light pattern for sensing.

Electronic system 1400 may include a display module 1460. Display module 1460 may be a near-eye display, and may graphically present information, such as images, videos, and various instructions, from electronic system 1400 to a user. Such information may be derived from one or more application modules 1422-1424, virtual reality engine 1426, one or more other hardware modules 1480, a combination thereof, or any other suitable means for resolving graphical content for the user (e.g., by operating system 1425). Display module 1460 may use LCD technology, LED technology (including, for example, OLED, ILED, µ-LED, AMO-LED, TOLED, etc.), light emitting polymer display (LPD) technology, or some other display technology.

Electronic system 1400 may include a user input/output module 1470. User input/output module 1470 may allow a user to send action requests to electronic system 1400. An action request may be a request to perform a particular action. For example, an action request may be to start or end an application or to perform a particular action within the application. User input/output module 1470 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1400. In some embodiments, user input/output module 1470 may provide haptic feedback to the user in accordance with instructions received from electronic system 1400. For example, the haptic feedback may be provided when an action request is received or has been performed.

Electronic system 1400 may include a camera 1450 that may be used to take photos or videos of a user, for example, for tracking the user's eye position. Camera 1450 may also be used to take photos or videos of the environment, for example, for VR, AR, or MR applications. Camera 1450 may include, for example, a complementary metal-oxide-semiconductor (CMOS) image sensor with a few millions or tens of millions of pixels. In some implementations, camera 1450 may include two or more cameras that may be used to capture 3-D images.

In some embodiments, electronic system 1400 may include a plurality of other hardware modules 1480. Each of other hardware modules 1480 may be a physical module within electronic system 1400. While each of other hardware modules 1480 may be permanently configured as a structure, some of other hardware modules 1480 may be temporarily configured to perform specific functions or temporarily activated. Examples of other hardware modules 1480 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1480 may be implemented in software.

In some embodiments, memory 1420 of electronic system 1400 may also store a virtual reality engine 1426. Virtual reality engine 1426 may execute applications within electronic system 1400 and receive position information, acceleration information, velocity information, predicted future positions, or any combination thereof of the HMD device from the various sensors. In some embodiments, the information received by virtual reality engine 1426 may be used for producing a signal (e.g., display instructions) to display module 1460. For example, if the received information indicates that the user has looked to the left, virtual reality engine 1426 may generate content for the HMD device that mirrors the user's movement in a virtual environment. Additionally, virtual reality engine 1426 may perform an action within an application in response to an action request received from user input/output module 1470 and provide feedback to the user. The provided feedback may be visual, audible, or haptic feedback. In some implementations, processor(s) 1410 may include one or more GPUs that may execute virtual reality engine 1426.

In various implementations, the above-described hardware and modules may be implemented on a single device or on multiple devices that can communicate with one another using wired or wireless connections. For example, in some implementations, some components or modules, such as GPUs, virtual reality engine 1426, and applications (e.g., tracking application), may be implemented on a console separate from the head-mounted display device. In some implementations, one console may be connected to or support more than one HMD.

In alternative configurations, different and/or additional components may be included in electronic system 1400. Similarly, functionality of one or more of the components can be distributed among the components in a manner different from the manner described above. For example, in some embodiments, electronic system 1400 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A system comprising:
  a display comprising a plurality of light sources; and
  a display controller including drive circuits for the plurality of light sources, the display controller configured to:
    determine a plurality of display zones of the display based on a field of view (FOV) of an eye of a user of the display;
    drive light sources in a first display zone of the plurality of display zones based on a first relationship between input display values and luminance levels for the light sources in the first display zone; and
    drive light sources in a second display zone of the plurality of display zones based on a second relationship between input display values and luminance levels for the light sources in the second display zone, wherein the second relationship is different from the first relationship.

2. The system of claim 1, wherein the plurality of display zones corresponds to a plurality of retina zones on a retina of the eye of the user having the FOV.

3. The system of claim 1, wherein the display controller is configured to determine the plurality of display zones by performing operations comprising:
  determining a maximum luminance location of the display based on the FOV of the eye of the user; and
  determining the plurality of display zones based on distances from the maximum luminance location to light sources of the display.

4. The system of claim 3, wherein the maximum luminance location is at a center of the FOV of the eye of the user, or is within a field of view of a fovea of the eye of the user having the FOV.

5. The system of claim 3, wherein:
  the first display zone is closer to the maximum luminance location than the second display zone; and
  for a same input display value, a corresponding first luminance level according to the first relationship is higher than a corresponding second luminance level according to the second relationship.

6. The system of claim 5, wherein:
  the first display zone is adjacent to the second display zone; and
  a difference between the corresponding first luminance level and the corresponding second luminance level is less than a threshold value.

7. The system of claim 1, wherein:
  the first display zone is adjacent to the second display zone; and
  driving a light source in the first display zone or the second display zone comprises extrapolating a first luminance level determined based on the first relationship and a second luminance level determined based on the second relationship to determine a target luminance level for the light source.

8. The system of claim 1, further comprising an eye-tracking subsystem configured to:
  track a position or a gaze direction of the eye of the user with respect to the display; and
  determine the FOV of the eye of the user based on the position or the gaze direction of the eye of the user with respect to the display.

9. The system of claim 1, wherein each light source of the plurality of light sources includes an organic light emitting diode (OLED) or a micro-light emitting diode (micro-LED).

10. The system of claim 1, further comprising a memory device configured to store a lookup table that specifies the first relationship and the second relationship.

11. A method comprising:
  determining a plurality of display zones of a display based on a field of view (FOV) of an eye of a user of the display;
  driving light sources in a first display zone of the plurality of display zones based on a first relationship between input display values and luminance levels for the light sources in the first display zone; and
  driving light sources in a second display zone of the plurality of display zones based on a second relationship between input display values and luminance levels for the light sources in the second display zone, wherein the second relationship is different from the first relationship.

12. The method of claim 11, wherein the plurality of display zones corresponds to a plurality of retina zones on a retina of the eye of the user having the FOV.

13. The method of claim 11, wherein determining the plurality of display zones comprises: determining a maximum luminance location of the display based on the FOV of the eye of the user of the display; and determining the plurality of display zones based on distances from the maximum luminance location to light sources of the display.

14. The method of claim 13, wherein the maximum luminance location is at a center of the FOV of the eye of the user, or is within a field of view of a fovea of the eye of the user having the FOV.

15. The method of claim 13, wherein:
  the first display zone is closer to the maximum luminance location than the second display zone; and
  for a same input display value, a corresponding first luminance level according to the first relationship is higher than a corresponding second luminance level according to the second relationship.

16. The method of claim 15, wherein:
  the first display zone is adjacent to the second display zone; and
  a difference between the corresponding first luminance level and the corresponding second luminance level is less than a threshold value.

17. The method of claim 11, wherein:
  the first display zone is adjacent to the second display zone; and
  driving a light source in the first display zone or the second display zone comprises extrapolating a first luminance level determined based on the first relationship and a second luminance level determined based on the second relationship to determine a target luminance level for the light source.

18. The method of claim 11, further comprising, at each time instant of a plurality of time instants:
  tracking a position or a gaze direction of the eye of the user with respect to the display; and
  determining the FOV of the eye of the user based on the position or the gaze direction of the eye of the user with respect to the display.

19. The method of claim 11, wherein the first display zone is characterized by a shape of a circle, a ring, an oval, a square, or a rectangle.

20. A non-transitory machine-readable storage medium including instructions stored thereon, the instructions, when executed by a display controller, cause the display controller to perform operations including:
  determining a plurality of display zones of a display based on a field of view (FOV) of an eye of a user of the display;
  driving light sources in a first display zone of the plurality of display zones based on a first relationship between input display values and luminance levels for the light sources in the first display zone; and
  driving light sources in a second display zone of the plurality of display zones based on a second relationship between input display values and luminance levels for the light sources in the second display zone, wherein the second relationship is different from the first relationship.

* * * * *